(12) United States Patent
Suzuki et al.

(10) Patent No.: US 11,906,970 B2
(45) Date of Patent: Feb. 20, 2024

(54) INFORMATION PROCESSING DEVICE AND INFORMATION PROCESSING METHOD

(71) Applicant: SONY GROUP CORPORATION, Tokyo (JP)

(72) Inventors: Kento Suzuki, Tokyo (JP); Atsushi Okamori, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 141 days.

(21) Appl. No.: 17/601,497

(22) PCT Filed: Mar. 4, 2020

(86) PCT No.: PCT/JP2020/009015
§ 371 (c)(1),
(2) Date: Oct. 5, 2021

(87) PCT Pub. No.: WO2020/213275
PCT Pub. Date: Oct. 22, 2020

(65) Prior Publication Data
US 2022/0197296 A1 Jun. 23, 2022

(30) Foreign Application Priority Data
Apr. 15, 2019 (JP) ................................. 2019-077272

(51) Int. Cl.
*G05D 1/02* (2020.01)
*G01C 21/30* (2006.01)
*G01C 21/16* (2006.01)

(52) U.S. Cl.
CPC ....... *G05D 1/0219* (2013.01); *G01C 21/1652* (2020.08); *G01C 21/30* (2013.01);
(Continued)

(58) Field of Classification Search
CPC .. G05D 1/0219; G05D 1/0214; G05D 1/0248; G05D 2201/0207; G05D 1/0274;
(Continued)

(56) References Cited

U.S. PATENT DOCUMENTS

2016/0282876 A1 9/2016 Shingu et al.
2018/0161986 A1* 6/2018 Kee .................... G06V 20/10
(Continued)

FOREIGN PATENT DOCUMENTS

CN 109154662 A 1/2019
EP 3098682 A1 11/2016
(Continued)

OTHER PUBLICATIONS

Machine Translation of JP2009020014A (Year: 2009).*
Machine Translation of JP2008040677A (Year: 2008).*
International Search Report and Written Opinion of PCT Application No. PCT/JP2020/009015, dated Apr. 14, 2020, 10 pages of ISRWO.

*Primary Examiner* — Faris S Almatrahi
*Assistant Examiner* — Sahar Motazedi
(74) *Attorney, Agent, or Firm* — CHIP LAW GROUP

(57) ABSTRACT

An information processing device according to the present disclosure includes an acquisition unit that acquires an arrangement of a landmark and surrounding terrain data, a first estimation unit that estimates a range in which a self-position is located on a basis of a landmark map that is a map indicating the arrangement of the landmark, and a second estimation unit that estimates the self-position from the range in which the self-position is located on a basis of a terrain data map that is a map indicating the surrounding terrain data.

9 Claims, 17 Drawing Sheets

(52) U.S. Cl.
CPC ......... *G05D 1/0214* (2013.01); *G05D 1/0248* (2013.01); *G05D 2201/0207* (2013.01)

(58) Field of Classification Search
CPC ... G05D 2201/0203; G05D 2201/0215; G01C 21/1652; G01C 21/30; G01C 21/206; G08G 1/00
See application file for complete search history.

(56) References Cited

U.S. PATENT DOCUMENTS

| | | | |
|---|---|---|---|
| 2018/0306589 A1* | 10/2018 | Holz | G05D 1/0274 |
| 2018/0307241 A1 | 10/2018 | Holz | |
| 2020/0124422 A1* | 4/2020 | Lin Sörstedt | G06T 7/74 |

FOREIGN PATENT DOCUMENTS

| | | | |
|---|---|---|---|
| JP | 2004-045051 A | | 2/2004 |
| JP | 2008-040677 A | | 2/2008 |
| JP | 2009020014 A | * | 1/2009 |
| JP | 2013-164754 A | | 8/2013 |
| JP | 2016-177749 A | | 10/2016 |
| JP | 2019-534486 A | | 11/2019 |
| KR | 10-2019-0003643 A | | 1/2019 |
| WO | 2018/194833 A1 | | 10/2018 |
| WO | 2019/111702 A1 | | 6/2019 |

* cited by examiner

FIG.10

| LANDMARK ID | OBSERVA-TION TIME | CATEGORY | DETAILS | MAP MATCHING INFORMATION | ATTITUDE | MAP RELATIVE ATTITUDE |
|---|---|---|---|---|---|---|
| ... | ... | ... | ... | ... | ... | ... |
| A01 | B01 | MUG | D01 | E01 | F01 | G01 |
| A02 | B02 | PEN STAND | D02 | E02 | F02 | G02 |
| ... | ... | ... | ... | ... | ... | ... |

121

| CATEGORY | SET MOVEMENT RANGE | ... |
|---|---|---|
| ... | ... | ... |
| MUG | J21 | ... |
| PEN STAND | J22 | ... |
| STUFFED DOLL | J23 | ... |
| PC | J24 | ... |
| ... | ... | ... |

| UPDATE TIME | TERRAIN DATA (CELL INFORMATION) | ... |
|---|---|---|
| ... | ... | ... |
| B21 | K01 | ... |
| ... | ... | ... |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2020/009015 filed on Mar. 4, 2020, which claims priority benefit of Japanese Patent Application No. JP 2019-077272 filed in the Japan Patent Office on Apr. 15, 2019. Each of the above-referenced applications is hereby incorporated herein by reference in its entirety.

FIELD

The present disclosure relates to an information processing device, an information processing method, and an information processing program. Specifically, the present disclosure relates to localization and mapping processing for a mobile object.

BACKGROUND

As a technology related to a mobile object such as an automobile or a robot, a technology called simultaneous localization and mapping (SLAM) in which the mobile object performs mapping of the surroundings and localization has been developed.

With regard to SLAM, a technology is known in which the degree of influence is calculated on the basis of the reliability of a reference object (a landmark) used in estimating a self-position and the self-position is estimated on the basis of the degree of influence.

CITATION LIST

Patent Literature

Patent Literature 1: JP 2008-40677 A

SUMMARY

Technical Problem

According to the conventional technology, even an object that may move can be used as a landmark for localization.

However, there is room for improvement in the conventional technology. For example, there is a possibility in the conventional technology that the degree of influence of an object (for example, personal belongings disposed on a personal desk or the like) that moves frequently, but is useful for localization is calculated to be low, and its use value is determined to be low in localization. In this case, the mobile object cannot respond to changes in the surrounding environment, and the accuracy of localization may decrease.

Therefore, the present disclosure proposes an information processing device, an information processing method, and an information processing program capable of performing localization and mapping processing stable with respect to changes in the surrounding environment.

Solution to Problem

According to the present disclosure, an information processing device includes an acquisition unit that acquires an arrangement of a landmark and surrounding terrain data; a first estimation unit that estimates a range in which a self-position is located on a basis of a landmark map that is a map indicating the arrangement of the landmark; and a second estimation unit that estimates the self-position from the range in which the self-position is located on a basis of a terrain data map that is a map indicating the surrounding terrain data.

BRIEF DESCRIPTION OF DRAWINGS

FIG. 10 is a diagram illustrating an example of landmark observation history information according to the embodiment.

DESCRIPTION OF EMBODIMENTS

Figure 1:
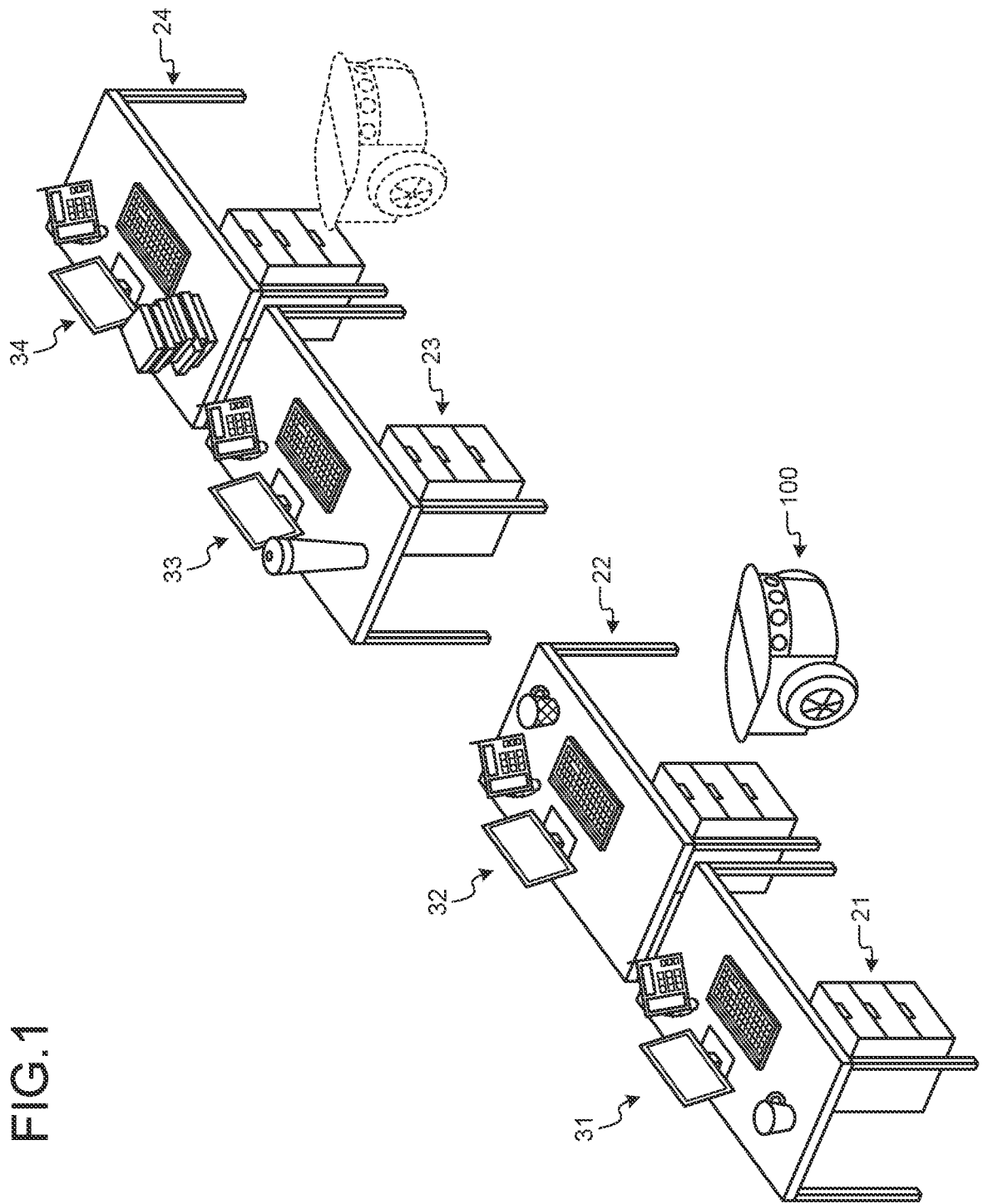
FIG. 1 is a diagram illustrating an example of information processing according to an embodiment.

Hereinafter, embodiments of the present disclosure will be described in detail with reference to the drawings. Note that in each of the following embodiments, the same parts are denoted by the same reference numerals, and redundant description will be omitted.

The present disclosure will be described according to the following order of items.
1. Embodiment
1-1. Example of Information Processing According to Embodiment 1-2. Configuration Example of Information Processing Device According to Embodiment
1-3. Procedure of Information Processing According to Embodiment
1-4. Modification According to Embodiment
1-4-1. Example of Calculation of Landmark Movement Range
1-4-2. Information Processing System
2. Other Embodiments
2-1. Configuration of Mobile Object
2-2. Others
3. Effects of Information Processing Device According to Present Disclosure
4. Hardware Configuration

1. Embodiment

1-1. Example of Information Processing According to Embodiment

FIG. 1 is a diagram illustrating an example of information processing according to an embodiment. The information processing according to the embodiment is performed by an information processing device 100 illustrated in FIG. 1.

The information processing device 100 is a predetermined mobile object that performs self-driving, and is an information processing terminal that performs the information processing according to the embodiment. In the embodiment, the information processing device 100 is, for example, an automatic cleaning robot or the like that operates in a factory, a school, an office space, or the like. Note that it is assumed in the following description that the information processing device 100 is mounted on an automatic cleaning robot or the like that is a mobile object, or the automatic cleaning robot itself functions as the information processing device 100.

First, a situation in which the information processing according to the embodiment is performed will be described in FIG. 1. In general, pieces of furniture such as a cabinet and a desk are regularly arranged in a factory or the like. For example, as illustrated in FIG. 1, pieces of furniture 21, furniture 22, furniture 23, and furniture 24 in which a personal desk and a cabinet are combined are arranged in a space where the information processing device 100 operates. In the example of FIG. 1, each of the pieces of the furniture 21, the furniture 22, the furniture 23, and the furniture 24 is assigned to a different operator. Consequently, as illustrated in FIG. 1, it is assumed that personal belongings 31, personal belongings 32, personal belongings 33, and personal belongings 34 such as a personal computer, a telephone, a mug, and stationery are installed in the furniture 21, the furniture 22, the furniture 23, and the furniture 24, respectively.

The information processing device 100 performs mapping processing and localization processing using SLAM in the space illustrated in FIG. 1. Note that the space illustrated in FIG. 1 is assumed to be a factory, a school, an office space, or the like, and thus it is presupposed that position estimation by a global positioning system (GPS) is difficult. In such processing, for example, the following problems occur.

First, in general SLAM mapping processing, in principle, an object that does not move is registered as a landmark, and an object that moves frequently is not registered as a landmark. Consequently, the accuracy of localization may decrease. For example, a mug, stationery, or the like, which is personal belongings illustrated in FIG. 1, is useful information for identifying the personal furniture 21 to 24, but is highly likely not to be registered as a landmark. As a result, the apparatus that performs SLAM cannot separately recognize a space in which similar pieces of furniture continue, and it may be difficult to estimate the self-position.

Second, even if the apparatus that performs SLAM registers personal belongings as a landmark, the accuracy of localization is not necessarily improved. For example, in a case where the apparatus that performs SLAM registers personal belongings as a landmark, the apparatus travels in a predetermined space a plurality of times, and observes the position of the personal belongings a plurality of times after a lapse of time. At this time, if the position of the personal belongings changes in a plurality of observations, it is difficult for the apparatus that performs SLAM to determine whether the position is changed due to the influence of errors or the position is shifted due to the movement of the personal belongings. For this reason, the apparatus that performs SLAM may not be able to effectively utilize the personal belongings as a landmark.

Furthermore, in a factory, an office space, or the like, it is difficult for the apparatus that performs SLAM to install a localization marker from a hygienic viewpoint or an aesthetic viewpoint. In view of such a situation, it is difficult to perform SLAM and accurately estimate the self-position in a factory or the like where similar terrain continues.

For example, in the example of FIG. 1, there is a possibility that the information processing device 100 erroneously recognizes a self-position in a case where the information processing device 100 is present between the furniture 21 and the furniture 22 and in a case where the information processing device 100 is present between the furniture 23 and the furniture 24. This is because there is a possibility that the information processing device 100 cannot recognize a difference in information between sensor information (for example, point cloud information for observing surrounding terrain and the like) obtained when the information processing device 100 is located between the furniture 21 and the furniture 22 and sensor information obtained when the information processing device 100 is located between the furniture 23 and the furniture 24.

As described above, it is desired for SLAM to accurately estimate the self-position in a space where similar terrain continues, for example, pieces of furniture or the like are regularly arranged.

Therefore, the information processing device 100 according to the present disclosure solves the above problems by processing to be described below.

Specifically, the information processing device 100 uses personal belongings that are predicted to move as a landmark. The information processing device 100 then estimates the self-position on the basis of the landmark movement range, thereby performing (robust) SLAM with high stability in a space where similar terrain is present. Hereinafter, the outline of information processing according to the embodiment will be described with reference to FIGS. 2 to 8.

Figure 2:
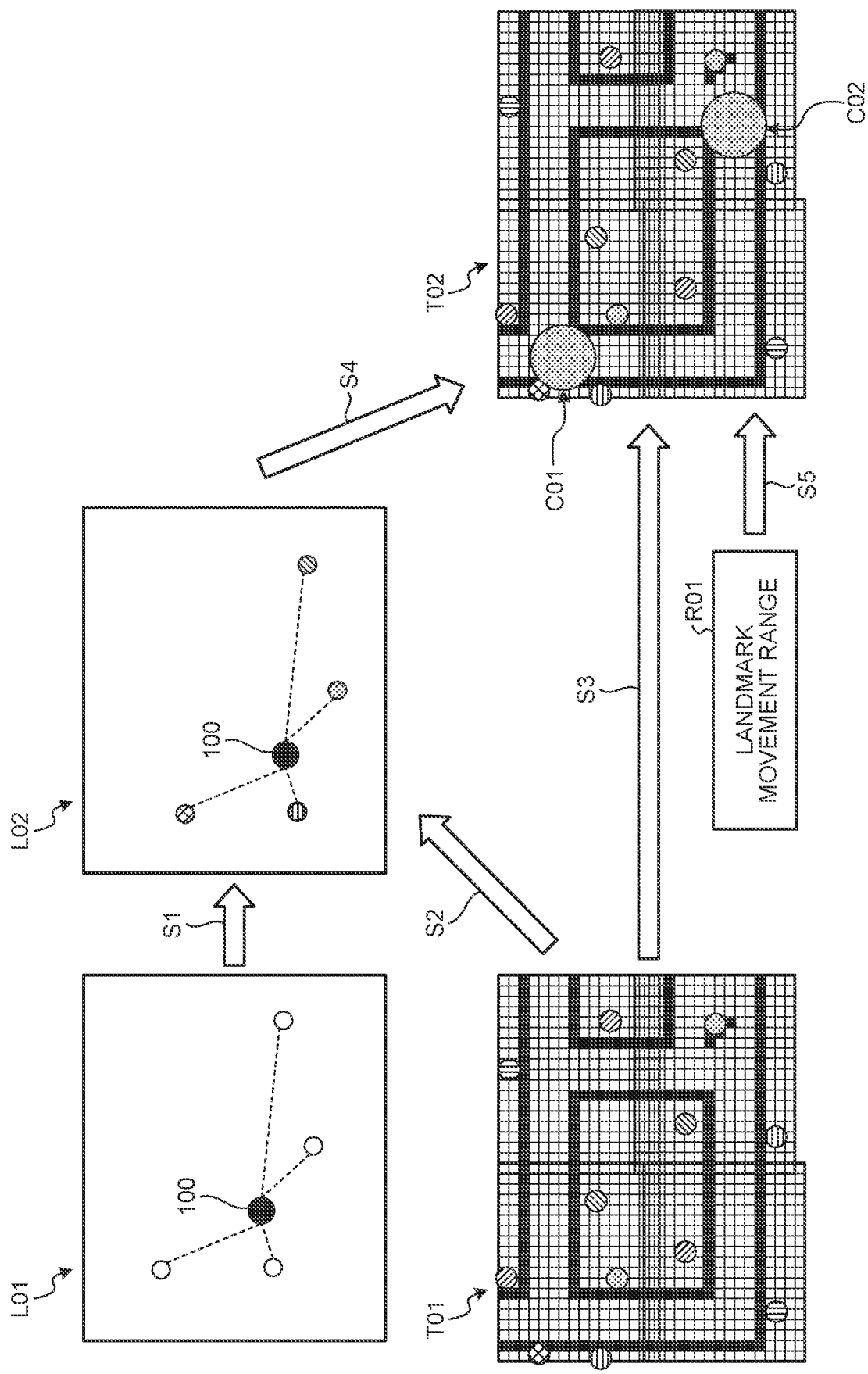
FIG. 2 is a diagram (1) for explaining an example of the information processing according to the embodiment.

FIG. 2 is a diagram (1) for explaining an example of the information processing according to the embodiment. First, the information processing device 100 observes surrounding objects, and detects an object that meets a predetermined condition among the observed objects as a landmark. For example, landmark information L01 illustrated in FIG. 1 indicates a positional relationship between the information processing device 100 and a plurality of landmarks (indicated by white circles in the landmark information L01) detected around the information processing device 100.

Furthermore, the information processing device 100 includes a landmark map T01 indicating the arrangement of the surrounding landmarks observed. For example, the information processing device 100 creates the landmark map T01 by moving back and forth in the surrounding space several times and repeating observation and detection of landmarks.

The information processing device 100 then refers to the landmark information L01 indicating the arrangement of the landmarks currently observed (step S1), and performs processing of comparing the landmark information L01 with the landmark map T01 (step S2). As a result, the information processing device 100 obtains landmark information L02. The landmark information L02 indicates that the surrounding landmarks observed in the landmark information L01 are collated with the landmark map T01 to be associated with specific objects.

Subsequently, the information processing device 100 refers to the landmark map T01 (step S3) and also refers to the landmark information L02 (step S4). The information processing device 100 superimposes the landmark information L02 on the information of the landmark map T01 and extracts candidate positions for the self-position as much as possible.

At this time, the information processing device 100 may refer to a landmark movement range R01 indicating a movement range in which each landmark is assumed to move (step S5). That is, the information processing device 100 does not detect the exact self-position on the basis of the landmark at the present time, but extracts a range (hereinafter, referred to as "candidate range") in which the self-position is assumed to be included on the basis of the range in which the landmark is assumed to move. In the example of FIG. 1, the information processing device 100 extracts, for example, a candidate range C01 or a candidate range C02 that is a range in which the information processing device 100 is assumed to be located on a map on the basis of the arrangement of the surrounding landmarks.

In this manner, the information processing device 100 acquires the arrangement of landmarks, and creates in advance the landmark map T01 indicating the acquired arrangement of the landmarks. Furthermore, the information processing device 100 acquires the arrangement of the landmarks, and collates the acquired arrangement of the landmarks with the landmark map T01 to estimate the range in which the self-position is located.

Figure 3:
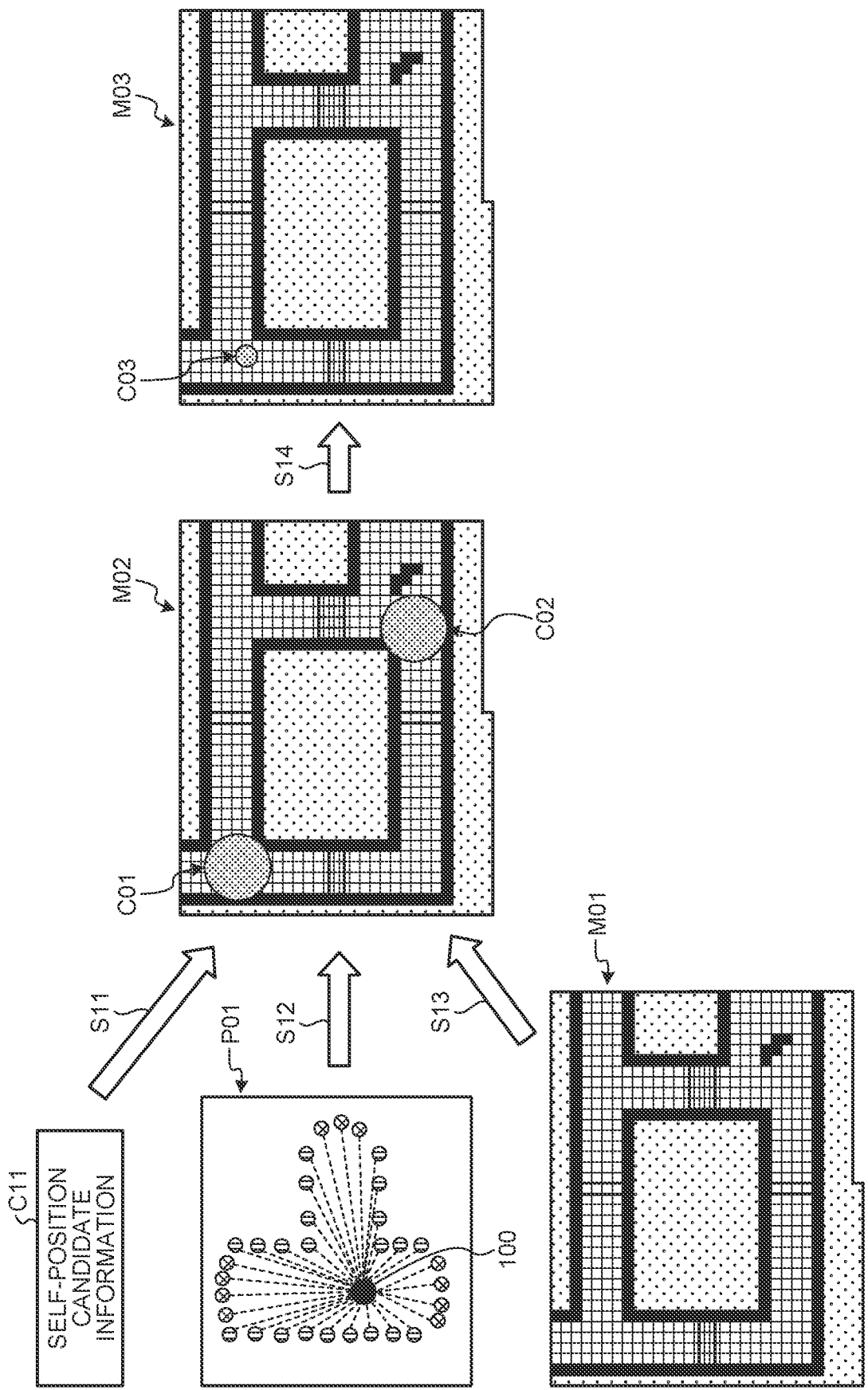
FIG. 3 is a diagram (2) for explaining an example of the information processing according to the embodiment.

Next, processing of step S5 and after will be described with reference to FIG. 3. FIG. 3 is a diagram (2) for explaining an example of the information processing according to the embodiment.

The information processing device 100 refers to self-position candidate information C11 estimated in step S5 (step S11). The self-position candidate information C11 is, for example, information (for example, coordinates, position information, and the like) indicating the candidate range C01 or the candidate range C02 illustrated in FIG. 1.

Furthermore, the information processing device 100 obtains a point cloud P01 using a sensor such as light detection and ranging or laser imaging detection and ranging (LiDAR) (step S12). Further, the information processing device 100 obtains a terrain data map M01 using a sensor such as LiDAR (step S13).

The information processing device 100 then performs positioning of the candidate range C01 and the candidate range C02 on the terrain data map M01 obtained to obtain a terrain data map M02. Although mismatching is likely to occur when positioning based on terrain data is performed globally, it is possible to prevent mismatching by narrowing down candidates for the self-position on the basis of the processing illustrated in FIG. 2. Moreover, the information processing device 100 narrows down a more accurate candidate range by comparing the candidate range C01 and the candidate range C02 with the point cloud P01 newly acquired (step S14). In the example of FIG. 3, it is assumed that the information processing device 100 determines that the actual self-position is not the candidate range C02 but the candidate range C01 from the figure data indicated by the point cloud P01. Further, the information processing device 100 can narrow down the self-position in a range narrower than the candidate range C01 on the basis of the point cloud P01. In the example of FIG. 3, the information processing device 100 calculates a candidate position C03 that is new self-position information on the basis of such information. A terrain data map M03 illustrated in FIG. 3 is a map reflecting the candidate position C03.

Note that FIG. 3 illustrates an example in which the information processing device 100 creates the terrain data map M02 and the terrain data map M03 in the flow of processing, but this is illustrated for convenience of description, and it is not always necessary to create the terrain data map M02 and the terrain data map M03.

Figure 4:
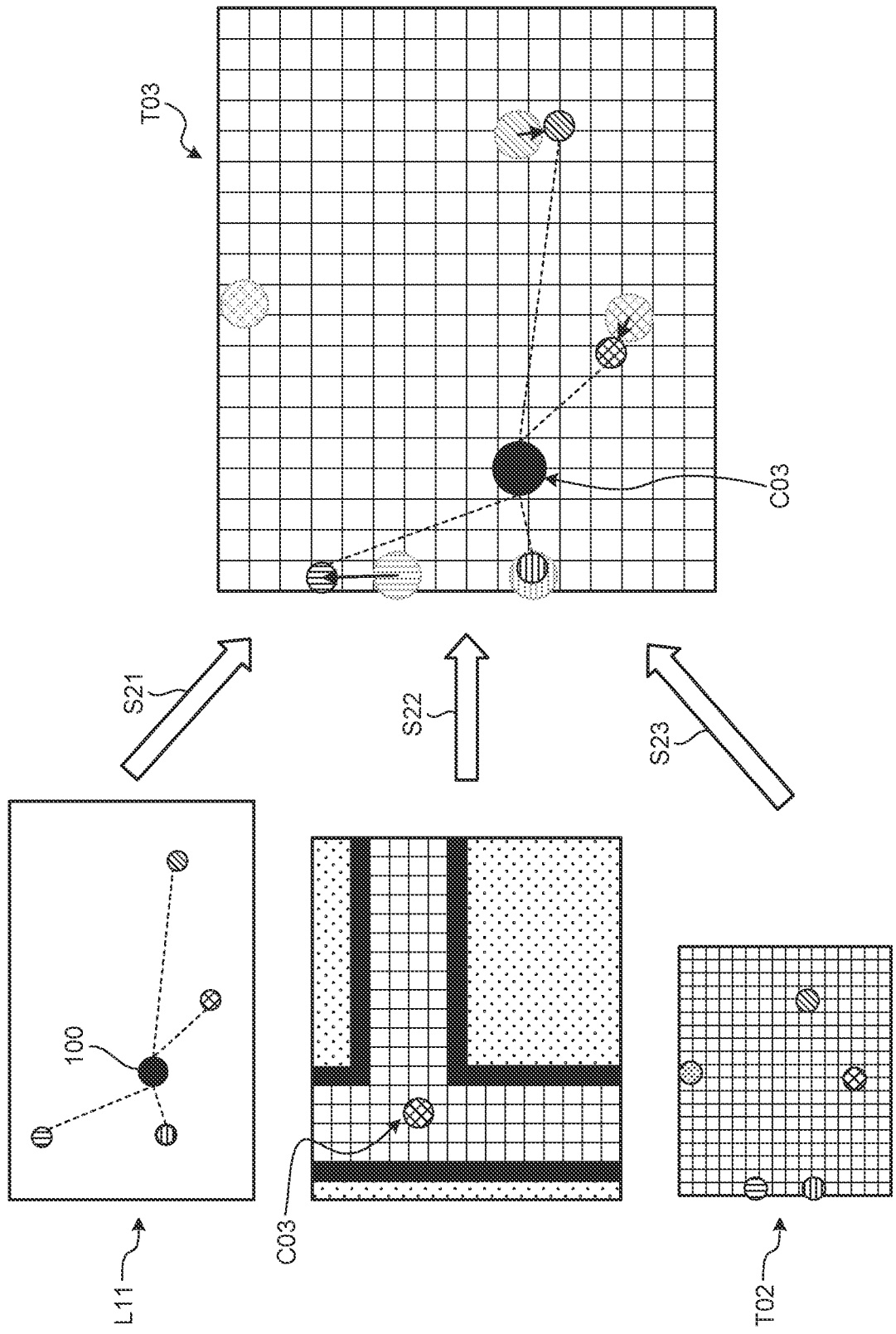
FIG. 4 is a diagram (3) for explaining an example of the information processing according to the embodiment.

Next, processing of step S14 and after will be described with reference to FIG. 4. FIG. 4 is a diagram (3) for explaining an example of the information processing according to the embodiment.

After calculating the candidate position C03, the information processing device 100 acquires landmark information L11 obtained by observing the landmark at the present time (step S21). Furthermore, the information processing device 100 acquires information of the candidate position C03 calculated in step S14 (step S22). In addition, the information processing device 100 acquires a landmark movement range T02 that is information indicating a range in which each landmark moves, the landmark movement range T02 being calculated in advance (step S23).

The information processing device 100 performs localization processing with higher accuracy on the basis of the information acquired. For example, the information processing device 100 obtains a landmark movement range T03 in which the candidates for the self-position are reflected in the landmark movement range T02 on the basis of the landmark information L11 and the candidate position C03. The information processing device 100 then estimates the self-position with higher accuracy as compared with the candidate position C03 in consideration of the movement range of each landmark. Although details will be described later, the information processing device 100 estimates the self-position on the basis of the movement range of a landmark that is a surrounding landmark indicated in the landmark movement range T03 and is likely to move (a possibility that the landmark has moved is indicated by an arrow in the landmark movement range T03).

Here, the landmark movement range will be described. The information processing device 100 moves in the space while repeating landmark observation processing, calculates a movement range in which the landmark has moved, and stores the information calculated. Note that the landmark movement range may be information obtained by calculation by the information processing device 100, or may be a movement range for each category of the landmark initially set in advance. The movement range for each category of the landmark initially set in advance is, for example, information in which a certain degree of movement range is artificially set in advance according to the type of the landmark (personal belongings in the embodiment). Specifically, the category (the type) of the landmark specifically includes stationery such as a pen stand, personal tableware such as a tumbler, and the like.

The landmark movement range is, for example, a result of aggregation such as an average moving distance of the landmark in time series based on the observation history of the landmark. For example, as the variation in the observation position of the landmark increases, the landmark movement range increases. Note that, in a case where the same landmark cannot be observed in a plurality of observations, the information processing device 100 may determine that the landmark has moved very largely and may give a very large movement range to the landmark.

As an example, the information processing device 100 calculates the landmark movement range by using the following formula (1).

$$lmr_1 = \sum_{k=1}^{n} \frac{|pos_1(t) - pos_1(t-1)|}{n} \quad (1)$$

In the above formula (1), $lmr_1$ indicates the movement range of a predetermined landmark 1. Further, $POS_1(t)$ indicates position information (coordinates and the like) of the landmark at a time t. In addition, $n_1$ indicates the number of observation trials for the landmark 1.

Note that the above formula (1) is an example, and the information processing device 100 may calculate the landmark movement range using various known calculation methods and statistical methods. For example, the information processing device 100 may calculate the landmark movement range using the squared error of a moving distance. In this case, since a large movement error is strongly reflected, the information processing device 100 can increase a penalty in a case where the landmark is lost.

Figure 5:
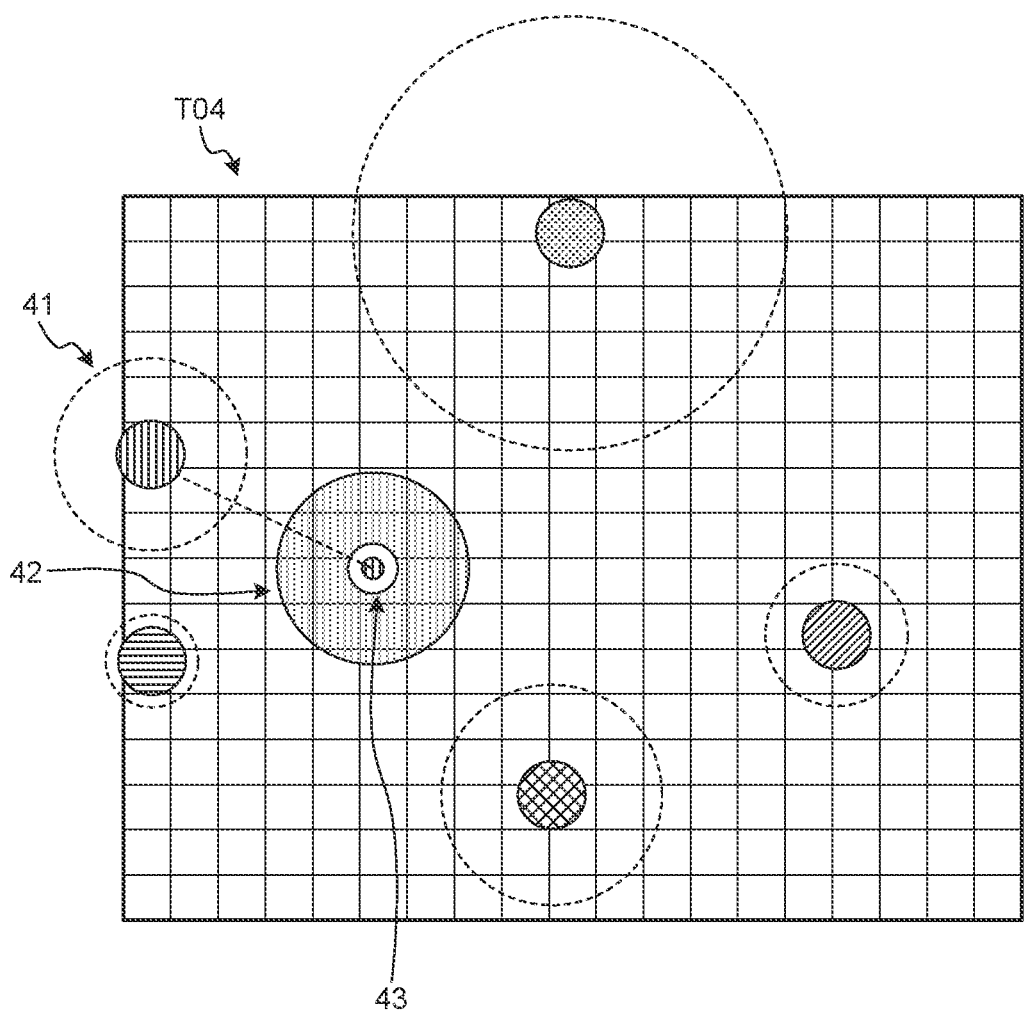
FIG. 5 is a diagram (1) for explaining an example of localization processing according to the embodiment.

The information processing device 100 uses the landmark movement range calculated in this manner at the time of localization using the landmark. Hereinafter, localization processing will be described with reference to FIGS. 5 to 8. FIG. 5 is a diagram (1) for explaining an example of localization processing according to the embodiment.

For example, each landmark and the movement range (indicated by a dotted line) of each landmark are indicated in a landmark movement range 104 illustrated in FIG. 5. In addition, the landmark movement range 104 also includes a candidate position 43 that is a candidate for the self-position of the information processing device 100. For example, the candidate position 43 corresponds to the candidate position C03 calculated in FIG. 4.

It is assumed in the example of FIG. 5 that the information processing device 100 calculates a possible range of the candidate position 43 on the basis of a landmark movement range 41. In this case, the possible range of the self-position of the candidate position 43 is enlarged on the basis of the landmark movement range 41. As a result, the information processing device 100 calculates a candidate range 42 as the possible range of the self-position.

Figure 6:
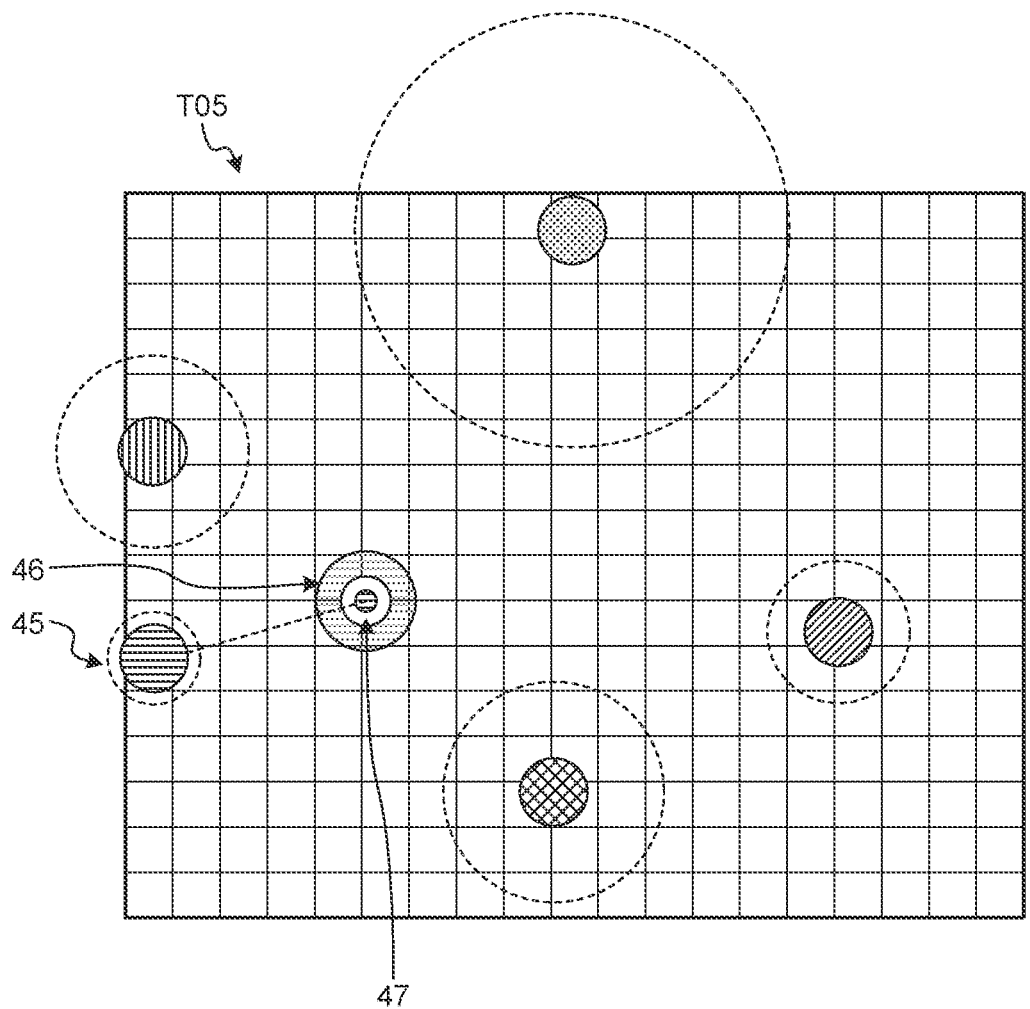
FIG. 6 is a diagram (2) for explaining an example of the localization processing according to the embodiment.

Next, an example in which the information processing device 100 estimates the self-position using another landmark movement range will be described with reference to FIG. 6. FIG. 6 is a diagram (2) for explaining an example of the localization processing according to the embodiment.

For example, each landmark and the movement range (indicated by a dotted line) of each landmark are indicated in a landmark movement range T05 illustrated in FIG. 6. In addition, the landmark movement range T05 also includes a candidate position 47 that is a candidate for the self-position of the information processing device 100. For example, the candidate position 47 corresponds to the candidate position C03 calculated in FIG. 4.

It is assumed in the example of FIG. 6 that the information processing device 100 calculates a possible range of the candidate position 47 on the basis of a landmark movement range 45. In this case, the possible range of the self-position of the candidate position 47 is enlarged on the basis of the landmark movement range 45. As a result, the information processing device 100 calculates a candidate range 46 as the possible range of the self-position. As illustrated in FIG. 6, since the landmark movement range 45 is narrower than the landmark movement range 41 illustrated in FIG. 5, the candidate range 46 is narrower than the candidate range 42 illustrated in FIG. 5. This indicates that the information processing device 100 can estimate the self-position in a narrower range.

Figure 7:
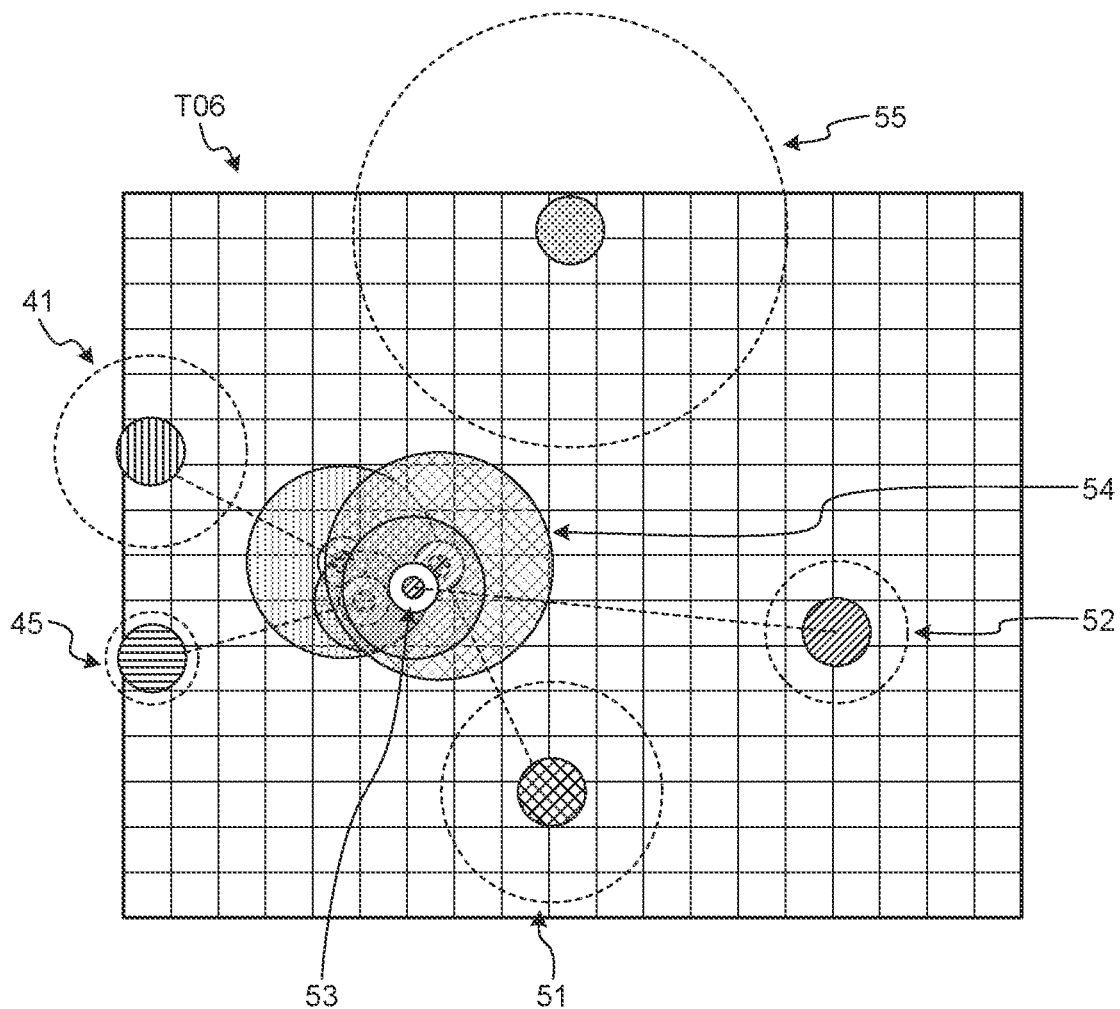
FIG. 7 is a diagram (3) for explaining an example of the localization processing according to the embodiment.

Next, an example in which the information processing device 100 estimates the self-position using a plurality of landmark movement ranges will be described with reference to FIG. 7. FIG. 7 is a diagram (3) for explaining an example of the localization processing according to the embodiment.

For example, each landmark and the movement range (indicated by a dotted line) of each landmark are indicated in a landmark movement range T06 illustrated in FIG. 7. In addition, the landmark movement range T06 also includes a candidate position 53 that is a candidate for the self-position of the information processing device 100. For example, the candidate position 53 corresponds to the candidate position C03 calculated in FIG. 4.

It is assumed in the example of FIG. 7 that the information processing device 100 calculates a possible range of the candidate position 53 on the basis of the landmark movement range 41, the landmark movement range 45, a landmark movement range 51, and a landmark movement range 52, which are the movement ranges of the respective landmarks included in a landmark movement range T07. Note that, since a landmark movement range 55 has a movement range larger than a predetermined threshold, the information processing device 100 may determine that the landmark is a landmark with low reliability and does not need to use the landmark movement range 55 in the localization processing.

As illustrated in FIG. 7, in a case where the self-position is estimated using a plurality of landmark movement ranges, the information processing device 100 superimposes candidate ranges obtained from the respective landmark movement ranges to obtain a plurality of candidate positions 54. For example, the information processing device 100 then estimates the center of gravity of the region where the plurality of candidate positions 54 obtained overlap as the self-position. In actual calculation, the information processing device 100 may perform calculation of integrating a plurality of hypotheses using, for example, an extended Kalman filter (EKF). Furthermore, the information processing device 100 may weight a candidate range obtained on the basis of each landmark movement range. For example, the information processing device 100 may determine that a candidate range obtained on the basis of a narrower landmark movement range is a landmark with higher reliability in localization, and perform adjustment such as increasing the weight.

Figure 8:
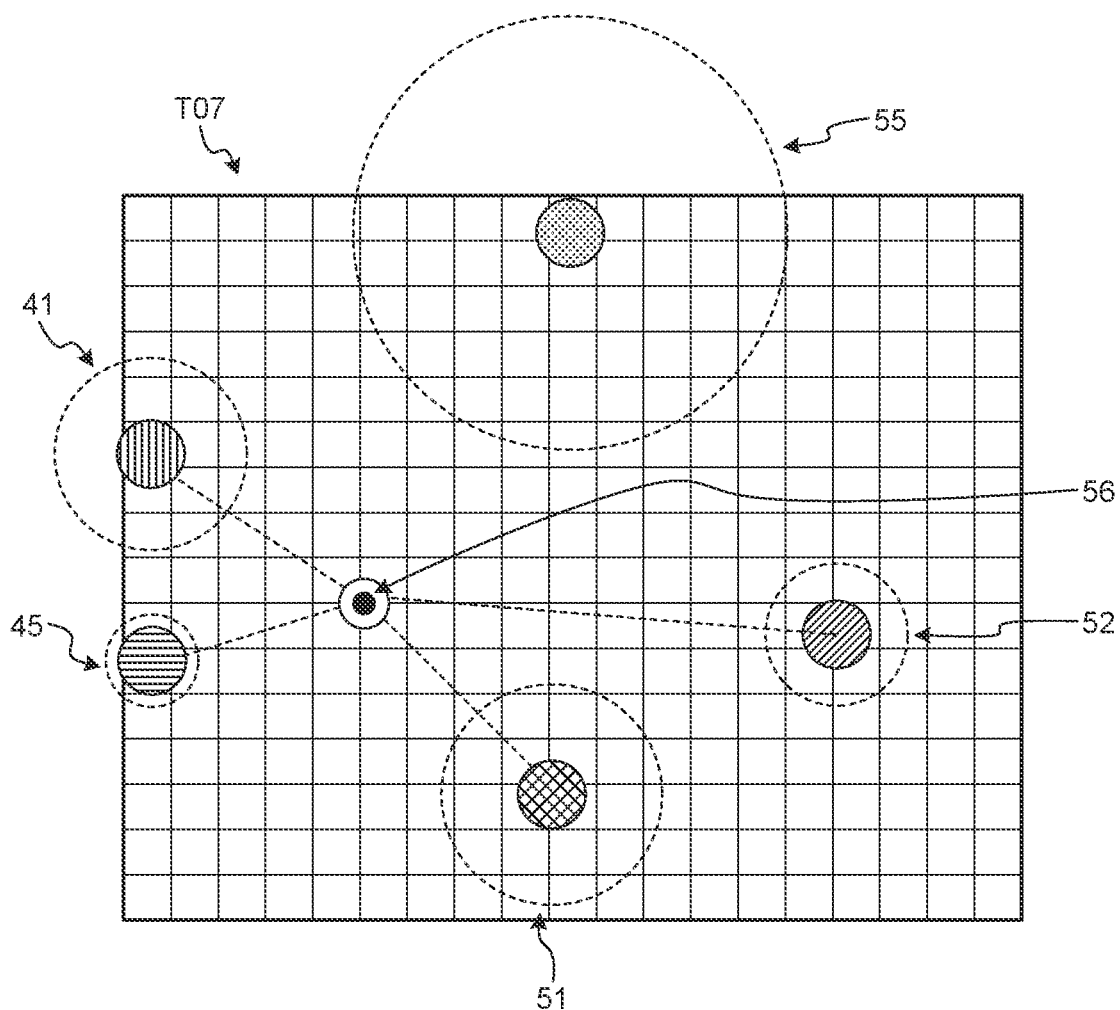
FIG. 8 is a diagram (4) for explaining an example of the localization processing according to the embodiment.

The result of the localization of FIG. 7 is illustrated in FIG. 8. FIG. 8 is a diagram (4) for explaining an example of the localization processing according to the embodiment.

For example, the landmark movement range T07 illustrated in FIG. 8 includes a self-position 56 estimated on the basis of the plurality of candidate positions 54 illustrated in FIG. 7. The self-position 56 is, for example, a position (as an example, the center of gravity of the centers of the plurality of candidate positions 54) obtained as a result of superimposing the plurality of candidate positions 54 illustrated in FIG. 7. As described above, even if each landmark moves, the information processing device 100 can consequently obtain the self-position with high accuracy by performing localization in consideration of the landmark movement range.

As described above, the information processing device 100 acquires the arrangement of landmarks and the surrounding terrain data. The information processing device 100 then estimates a range (a candidate range) in which the self-position is located on the basis of a landmark map that is a map indicating the arrangement of the landmarks, and estimates the self-position in the range in which the self-position is located on the basis of a terrain data map that is a map indicating surrounding terrain data.

Consequently, the information processing device 100 can perform localization using a landmark assumed to move frequently. As a result, the information processing device 100 can improve the performance of SLAM in a space in which similar terrain continues such as a factory, and thus can perform localization and mapping processing stable with respect to changes in the surrounding environment.

Hereinafter, the configuration of the information processing device 100 that performs the information processing described above will be described in detail with reference to FIG. 9 and the subsequent drawings.

1-2. Configuration Example of Information Processing Device According to Embodiment A configuration of the information processing device 100 will be described with reference to FIG. 9. FIG. 9 is a diagram illustrating a configuration example of the information processing device 100 according to the embodiment. As illustrated in FIG. 9, the information processing device 100 includes a communication unit 110, a storage unit 120, a control unit 130, a detection unit 140, an input unit 150, and an output unit 160. Note that the configuration illustrated in FIG. 9 is a functional configuration, and the hardware configuration may be different from the functional configuration. Furthermore, the functions of the information processing device 100 may be distributed and implemented in a plurality of physically separated devices.

The communication unit 110 is implemented by, for example, a network interface card (NIC) or the like. The communication unit 110 may be a universal serial bus (USB) interface including a USB host controller, a USB port, and the like. Furthermore, the communication unit 110 may be a wired interface or a wireless interface. For example, the communication unit 110 may be a wireless communication interface of a wireless LAN system or a cellular communication system. The communication unit 110 functions as a communication means or a transmission means of the information processing device 100. For example, the communication unit 110 is connected to a network N (the Internet or the like) in a wired or wireless manner, and transmits and receives information to and from another information processing terminal or the like via the network N.

The storage unit 120 is implemented by, for example, a semiconductor memory element such as a random access memory (RAM) or a flash memory, or a storage device such as a hard disk or an optical disk. The storage unit 120 stores various data.

For example, the storage unit 120 stores a learning device (an image recognition model) that has learned an object to be detected, data related the object detected, and the like for image recognition processing in self-driving. Furthermore, the storage unit 120 may store map data for performing self-driving or the like.

Moreover, the storage unit 120 may store information related to a vehicle controlled under self-driving by the information processing device 100. For example, the storage unit 120 stores information such as the size, weight, and vehicle type of a vehicle body.

Figure 9:
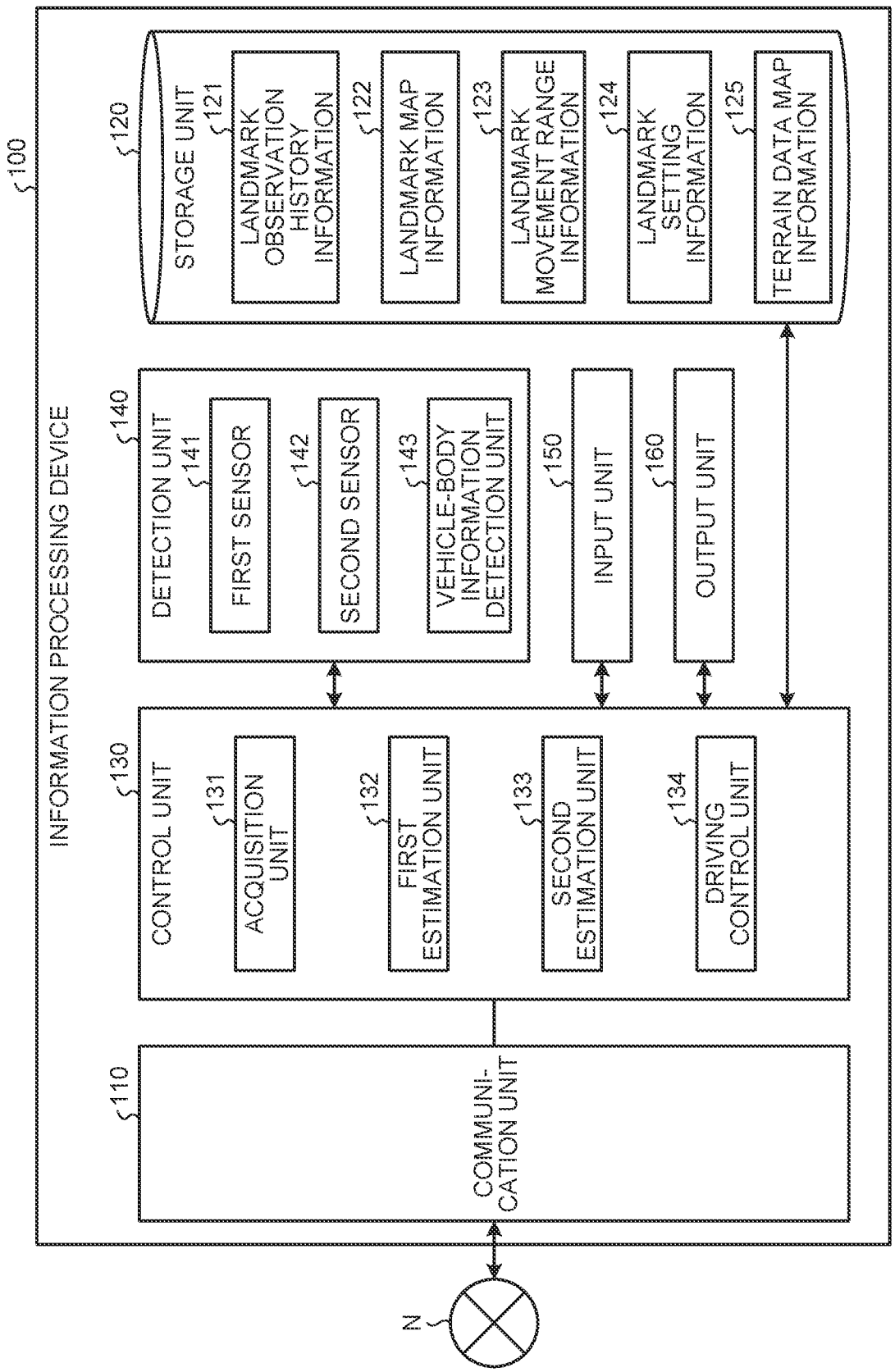
FIG. 9 is a diagram illustrating a configuration example of an information processing device according to the embodiment.

In addition, the storage unit 120 stores information including landmark observation history information 121, landmark map information 122, landmark movement range information 123, landmark setting information 124, and terrain data map information 125 illustrated in FIG. 9. Each piece of information will be described with reference to FIG. 10 and subsequent drawings.

The landmark observation history information 121 indicates history information of landmarks observed by the information processing device 100. FIG. 10 is a diagram illustrating an example of the landmark observation history information 121 according to the embodiment. In the example illustrated in FIG. 10, the landmark observation history information 121 includes items such as "landmark ID", "observation time", "category", "details", "map matching information", "attitude", and "map relative attitude".

"Landmark ID" indicates identification information for identifying a landmark. "Observation time" indicates the time when the landmark is observed. Note that, in the example of FIG. 10, the observation time is indicated by a concept such as "B01", but in practice, the item "observation time" indicates a specific time when the landmark is observed. Note that the item "observation time" may hold a plurality of pieces of time information instead of a single piece of time information. For example, a plurality of pieces of time information may be held for a landmark observed a plurality of times.

"Category" indicates a category (a type) that is set in the landmark. The category is artificially set by, for example, an administrator of the information processing device 100 or the like. "Details" indicate detailed information of the landmark. The detailed information is, for example, information acquired at the time of observing the landmark, and is, for example, information related to the color and the owner of the landmark, and the like.

"Map matching information" indicates information as to whether or not the landmark is collated on a landmark map. "Attitude" indicates the attitude (the position, orientation, or the like) of a landmark observed on the map. "Map relative attitude" indicates a relative attitude (a position, an orientation, or the like) from the landmark map to the landmark.

That is, according to the example illustrated in FIG. 10, in the landmark with the landmark ID "A01", the observation time is "B01", the category is "mug", and the details are "D01". In addition, in the landmark with the landmark ID "A01", the map matching information is "E01", the attitude is "F01", and the map relative attitude is "G01". Note that "B01", "D01", "E01", "F01", and "G01" are conceptual information, and in practice, include the specific information described above.

Figure 11:
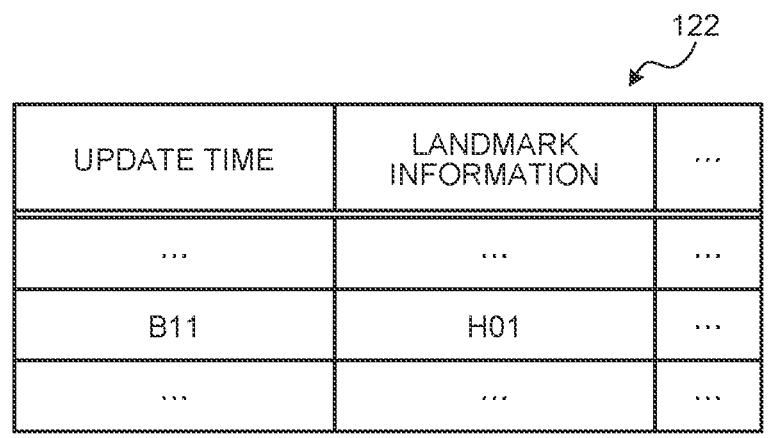
FIG. 11 is a diagram illustrating an example of landmark map information according to the embodiment.

The landmark map information 122 indicates map information on which landmarks are plotted. The map information on which landmarks are plotted is, for example, the landmark map T01 illustrated in FIG. 2. FIG. 11 is a diagram illustrating an example of the landmark map information 122 according to the embodiment. In the example illustrated in FIG. 11, the landmark map information 122 includes items such as "update time" and "landmark information".

"Update time" indicates the time when the landmark map is updated. "Landmark information" indicates information of each landmark included in the landmark map. In the example of FIG. 11, the landmark information is indicated by a concept such as "H01", but in practice, the information of each landmark illustrated in FIG. 10 and the information related to the arrangement (the coordinates, position information, and the like) of landmarks on the map is stored in the item "observation time".

That is, in the example illustrated in FIG. 11, the landmark map is updated at the update time "B11", and the landmark information included in the landmark map is "H01".

Figure 12:
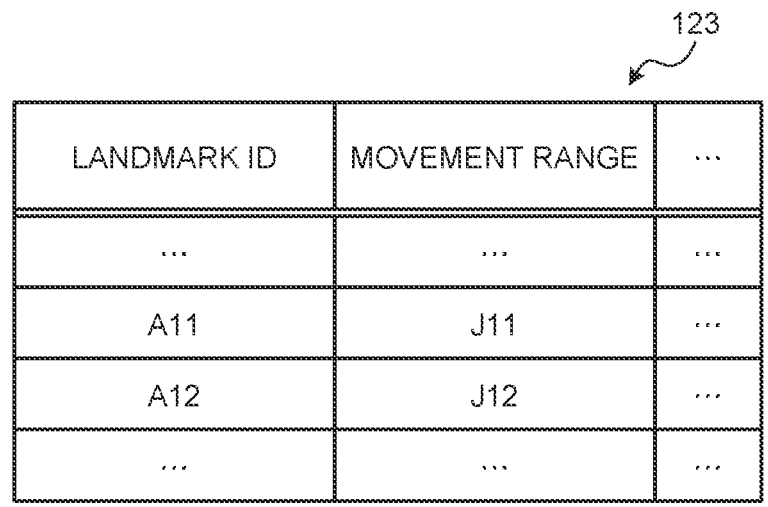
FIG. 12 is a diagram illustrating an example of landmark movement range information according to the embodiment.

The landmark movement range information 123 indicates the movement range of the landmark. FIG. 12 is a diagram illustrating an example of the landmark movement range information 123 according to the embodiment. In the example illustrated in FIG. 12, the landmark movement range information 123 includes items such as "landmark ID" and "movement range".

"Landmark ID" corresponds to the same item illustrated in FIG. 10. "Movement range" indicates information obtained by quantifying the range in which the landmark moves. Note that the landmark movement range may be indicated by coordinate information on the map or the like, may be indicated by information indicating the size of a movement range (for example, a diameter from an observed position or the like), or may be indicated by a vector indicating movement from a certain point to another point or the like. In the example of FIG. 12, the movement range is indicated by a concept such as "J11", but in practice, numerical information indicating a specific movement range or the like is stored in the item "movement range".

That is, according to the example illustrated in FIG. 12, in the landmark identified by the landmark ID "A11", the movement range is "J11".

Figure 13:
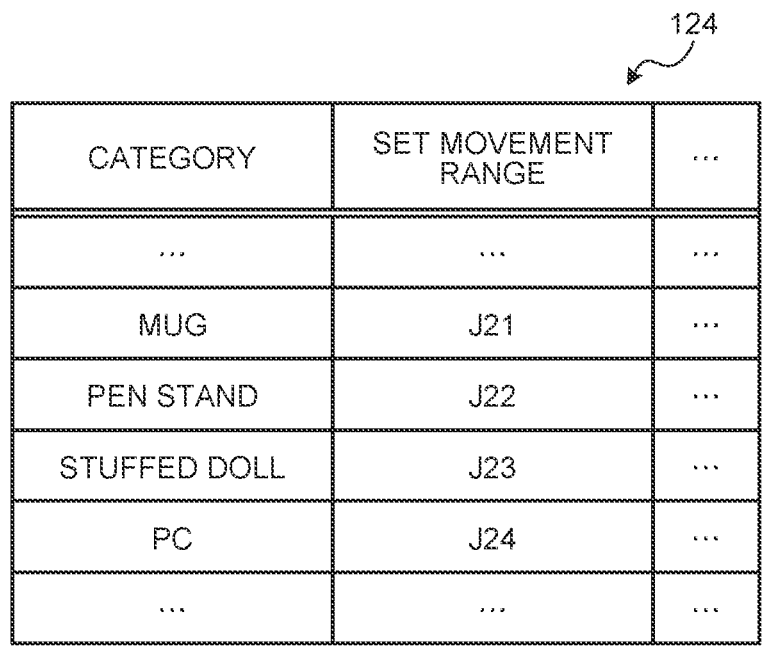
FIG. 13 is a diagram illustrating an example of landmark setting information according to the embodiment.

The landmark setting information 124 indicates the movement range of a landmark artificially set in advance. FIG. 13 is a diagram illustrating an example of the landmark setting information 124 according to the embodiment. In the example illustrated in FIG. 13, the landmark setting information 124 includes items such as "category" and "set movement range".

"Category" corresponds to the same item illustrated in FIG. 10. "Set movement range" indicates information that is artificially set in advance and is obtained by quantifying the range in which the landmark moves. In the example of FIG. 13, the movement range is indicated by a concept such as "J21", but in practice, numerical information indicating a specific movement range or the like is stored in the item "movement range".

That is, according to the example illustrated in FIG. 13, "J21" is set in advance as the movement range in the category "mug".

Figure 14:
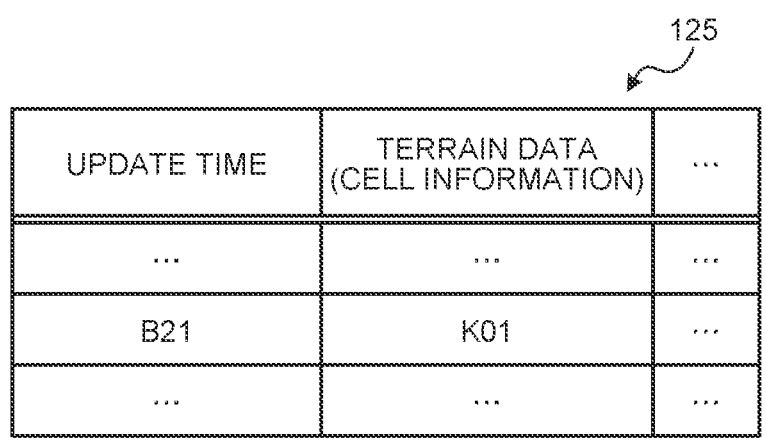
FIG. 14 is a diagram illustrating an example of terrain data map information according to the embodiment.

The terrain data map information 125 indicates information related to a map created on the basis of terrain data. The map created on the basis of the terrain data is, for example, the terrain data map M01 illustrated in FIG. 3. FIG. 14 is a diagram illustrating an example of the terrain data map information 125 according to the embodiment. In the example illustrated in FIG. 14, the terrain data map information 125 includes items such as "update time" and "terrain data (cell information)".

"Update time" indicates the time when the terrain data map is updated. "Terrain data (cell information)" indicates cell information in map information based on terrain data. In the example of FIG. 14, the terrain data is illustrated by a concept such as "K01", but in practice, information indicating specific terrain data or the like is stored in the item "terrain data". The terrain data is, for example, grid-like data created on the basis of an observation technology such as LiDAR. In addition, the terrain data may be stochastically expressed on a map created. For example, on the terrain data map M01 illustrated in FIG. 3, the closer to black, the higher the existence probability of an obstacle. In addition, on the terrain data map M01, the region surrounded by black indicates a space (an unscanned area) where the terrain data cannot not be observed.

That is, in the example illustrated in FIG. 14, the terrain data map is updated at the update time "B21", and the terrain data (the cell information) included in the terrain data map is "K01".

Returning to FIG. 9, the description will be continued. The detection unit 140 detects various types of information related to the information processing device 100. Specifically, the detection unit 140 detects the environment around the information processing device 100, the position information of the information processing device 100, information related to an apparatus connected to the information processing device 100, and the like. The detection unit 140 may be read as a sensor that detects various types of information. The detection unit 140 according to the embodiment includes a first sensor 141, a second sensor 142, and a vehicle-body information detection unit 143.

The first sensor 141 includes various sensors used for observing the landmark. For example, the first sensor 141 is a camera used for image recognition of the landmark or the like. Specifically, the first sensor 141 is an RGB camera capable of capturing a red green blue (RGB) image for recognition, and specifically includes a monocular camera, a stereo camera, an active infrared (IR) camera, and the like. Note that the first sensor 141 is not limited to this example, and may be any known sensor as long as the sensor can observe the landmark.

The second sensor 142 includes various sensors used to acquire terrain data. For example, the second sensor 142 is a depth sensor capable of detecting depth data and distance measurement data for obtaining the terrain data, and specifically includes a sensor using a LiDAR method, a stereo camera, an active IR camera, and the like. Note that the second sensor 142 is not limited to this example, and may be any known sensor as long as the sensor is capable of detecting the terrain data.

The vehicle-body information detection unit 143 is a sensor that measures the information of the information processing device 100 and a vehicle body on which the information processing device 100 is mounted.

For example, the vehicle-body information detection unit 143 detects the behavior of the information processing device 100 and the vehicle body on which the information processing device 100 is mounted. For example, the vehicle-body information detection unit 143 is an acceleration sensor that detects the acceleration of the vehicle body, a gyro sensor that detects a behavior, an inertial measurement unit (IMU), or the like.

Furthermore, the vehicle-body information detection unit 143 may measure the behavior of the vehicle body on which the information processing device 100 is mounted. For example, the vehicle-body information detection unit 143 measures the operation amount of a brake, an accelerator, a steering, or the like of the vehicle body. For example, the vehicle-body information detection unit 143 measures an amount corresponding to a force (a pressure or the like)

applied to a brake or an accelerator using a sensor or the like mounted on each of the brake, the accelerator, and the steering of the vehicle body. Moreover, the vehicle-body information detection unit 143 may measure the speed, acceleration, acceleration and deceleration amounts, yaw rate information, and the like of the vehicle body. The vehicle-body information detection unit 143 may measure the information related to the behavior of the vehicle body not only by the sensors described above and the like but also by various known technologies.

Furthermore, the vehicle-body information detection unit 143 may include a microphone that collects sound around the information processing device 100, an illuminance sensor that detects illuminance around the information processing device 100, a humidity sensor that detects humidity around the information processing device 100, a geomagnetic sensor that detects a magnetic field at a location of the information processing device 100, and the like.

The input unit 150 is a processing unit for receiving various operations from a user or the like who uses the information processing device 100. The input unit 150 receives inputs of various types of information via, for example, a touch panel, a microphone, or the like.

The output unit 160 is a processing unit for outputting various types of information. The output unit 160 is, for example, a display, a speaker, or the like.

The control unit 130 is implemented by, for example, a central processing unit (CPU), a micro processing unit (MPU), a graphics processing unit (GPU), or the like executing a program (for example, the information processing program according to the present disclosure) stored inside the information processing device 100 with a random access memory (RAM) or the like as a work area. Furthermore, the control unit 130 is a controller, and may be implemented by, for example, an integrated circuit such as an application specific integrated circuit (ASIC) or a field programmable gate array (FPGA).

As illustrated in FIG. 9, the control unit 130 includes an acquisition unit 131, a first estimation unit 132, a second estimation unit 133, and a driving control unit 134, and implements or performs functions and operations of information processing to be described below. Note that the internal configuration of the control unit 130 is not limited to the configuration illustrated in FIG. 9, and may be another configuration as long as information processing to be described later is performed.

The acquisition unit 131 acquires various types of information. For example, the acquisition unit 131 acquires various types of information acquired by a sensor (the detection unit 140) included in a mobile object on which the information processing device 100 is mounted.

For example, the acquisition unit 131 acquires information related to the landmark. Specifically, the acquisition unit 131 acquires the arrangement of landmarks on the basis of the information detected by the first sensor 141. Note that the landmark is a mark used for estimating the self-position, and an object with a low movement frequency is usually selected. However, in the embodiment, the landmark may be personal belongings including stationery or tableware that can be carried by a person, such as a mug and a pen stand, as described above.

As the first sensor 141, the acquisition unit 131 acquires the arrangement of landmarks by image recognition processing using an image sensor. More specifically, the acquisition unit 131 acquires the arrangement of landmarks by image recognition processing using an image captured by an RGB camera.

For example, the acquisition unit 131 detects an object as a landmark candidate from the image by the image recognition processing. At this time, the acquisition unit 131 may use a depth image detected by the second sensor 142 as image data in order to create a landmark map. Alternatively, the depth image can be substituted by depth estimation.

In addition, in a case where the acquisition unit 131 extracts an object suitable as a landmark on the basis of the result of object recognition, the acquisition unit 131 assigns a landmark ID to the object extracted, and stores the assigned information in the storage unit 120. Note that, in detection and extraction of the landmark, the acquisition unit 131 may perform image recognition using a learning model or the like that learns in advance an object to be detected and extracted as a landmark.

In addition, the acquisition unit 131 acquires the landmark movement range together with the arrangement of landmarks. Specifically, as illustrated in FIG. 5 and the like, the acquisition unit 131 acquires the arrangement of a plurality of landmarks and the movement ranges of the plurality of landmarks. The acquisition unit 131 stores the acquired the landmark movement range in the storage unit 120 in association with the landmark ID or the like.

In addition, the acquisition unit 131 may acquire a movement range set in advance for each category of the landmark together with the arrangement of landmarks. For example, the acquisition unit 131 acquires the movement range that is set in advance for each category of the landmark by an artificial input operation by the administrator or the like of the information processing device 100. As will be described later, in a case where the movement range of the landmark is unknown, the information processing device 100 may read the existing movement range set in advance from the storage unit 120 and estimate the self-position on the basis of the movement range.

In addition, the acquisition unit 131 acquires information related to terrain data. Specifically, the acquisition unit 131 acquires the terrain data on the basis of the information detected by the second sensor 142.

For example, the acquisition unit 131 acquires, as the second sensor 142, the terrain data from depth data using a depth sensor. More specifically, the acquisition unit 131 acquires the terrain data from depth data measured using the LiDAR method. In this manner, the acquisition unit 131 acquires the terrain data map information by performing terrain-based SLAM. The acquisition unit 131 stores the terrain data acquired in the storage unit 120.

Furthermore, the acquisition unit 131 may acquire control data or the like for controlling the operation of the information processing device 100, in addition to the information related to the landmark or the terrain data. For example, the acquisition unit 131 acquires IMU data and the like detected by the vehicle-body information detection unit 143.

The acquisition unit 131 stores the information acquired in the storage unit 120 as appropriate. Further, the acquisition unit 131 may acquire information required for processing from the storage unit 120 as appropriate. Furthermore, the acquisition unit 131 may acquire the information required for processing via the detection unit 140 or the input unit 150, or may acquire information from an external device via the network N. That is, the acquisition unit 131 does not necessarily acquire information detected by the information processing device 100 itself, and may acquire, for example, an image captured by an external device or the like.

The first estimation unit 132 estimates a range in which the self-position is located on the basis of a landmark map that is a map indicating the arrangement of landmarks. For example, as illustrated in FIG. 2, the first estimation unit 132 estimates a range (a candidate range) in which the self-position is assumed to be located on the basis of the landmark map.

At this time, the first estimation unit 132 estimates the range in which the self-position is located on the basis of the arrangement of landmarks and the movement ranges of the landmarks. That is, the first estimation unit 132 estimates the candidate range of the self-position in consideration of the possibility that the landmarks have moved.

In addition, the first estimation unit 132 estimates the range in which the self-position is located on the basis of the arrangement of the plurality of landmarks and the movement ranges of the plurality of landmarks. For example, as illustrated in FIG. 2, the first estimation unit 132 estimates the candidate range on the basis of the positional relationship with a plurality of landmarks included in the landmark map. As a result, the first estimation unit 132 can narrow down the candidate range as compared with a case where the candidate range is estimated from a single landmark.

Note that the first estimation unit 132 may estimate the range in which the self-position is located on the basis of the arrangement of the landmarks and the movement range set in advance for each category of the landmarks. For example, in a case where the reliability of the landmark movement range is low (for example, in a case where the number of times of trial for observing the movement range is equal to or less than a threshold or the like), the first estimation unit 132 may narrow down the candidate range on the basis of the movement range set in advance for each category of the landmarks.

The second estimation unit 133 estimates the self-position from the range in which the self-position is located on the basis of a terrain data map that is a map indicating surrounding terrain data. For example, as illustrated in FIG. 3, the second estimation unit 133 estimates the self-position from a candidate range that is a range in which the self-position is assumed to be located on the basis of the terrain data map (including information obtained by a point cloud or the like).

In addition, the second estimation unit 133 estimates the self-position from the range in which the self-position is located on the basis of the terrain data map and the landmark movement range. For example, as illustrated in FIGS. 5 to 8, the second estimation unit 133 further narrows down the self-position from the candidate range estimated in consideration of the landmark movement range.

The second estimation unit 133 estimates the self-position from the range in which the self-position is located on the basis of the terrain data map and the movement ranges of the plurality of landmarks. More specifically, the second estimation unit 133 estimates the self-position from the range in which the self-position is located on the basis of a plurality of candidates for the self-position estimated on the basis of the movement range of each landmark. For example, as illustrated in FIG. 8, the second estimation unit 133 narrows down the self-position from the candidate ranges estimated by superimposing the self-positions estimated from the movement ranges of the plurality of landmarks. As a result, the second estimation unit 133 can accurately estimate the self-position.

Note that the second estimation unit 133 may estimate the self-position from the range in which the self-position is located on the basis of the terrain data map and the movement range set in advance for each category of the landmark. That is, the second estimation unit 133 may estimate the self-position on the basis of the movement range set in advance but not necessarily the movement range acquired by observation. As a result, even in a case where the landmark movement range information is not present immediately after starting localization or the like, the second estimation unit 133 can perform processing using a value set in advance as a default value.

Note that the second estimation unit 133 may estimate the self-position from the range in which the self-position is located on the basis of the terrain data map and the control data. For example, the second estimation unit 133 estimates the self-position so as to include the terrain data map and IMU data. As a result, the second estimation unit 133 can improve the accuracy of localization as compared with estimation that does not use the control data.

The driving control unit 134 performs processing subsequent to the second estimation unit 133. For example, the driving control unit 134 controls the self-driving of the mobile object on the basis of the self-position estimated by the second estimation unit 133.

1-3. Procedure of Information Processing According to Embodiment

Figure 15:
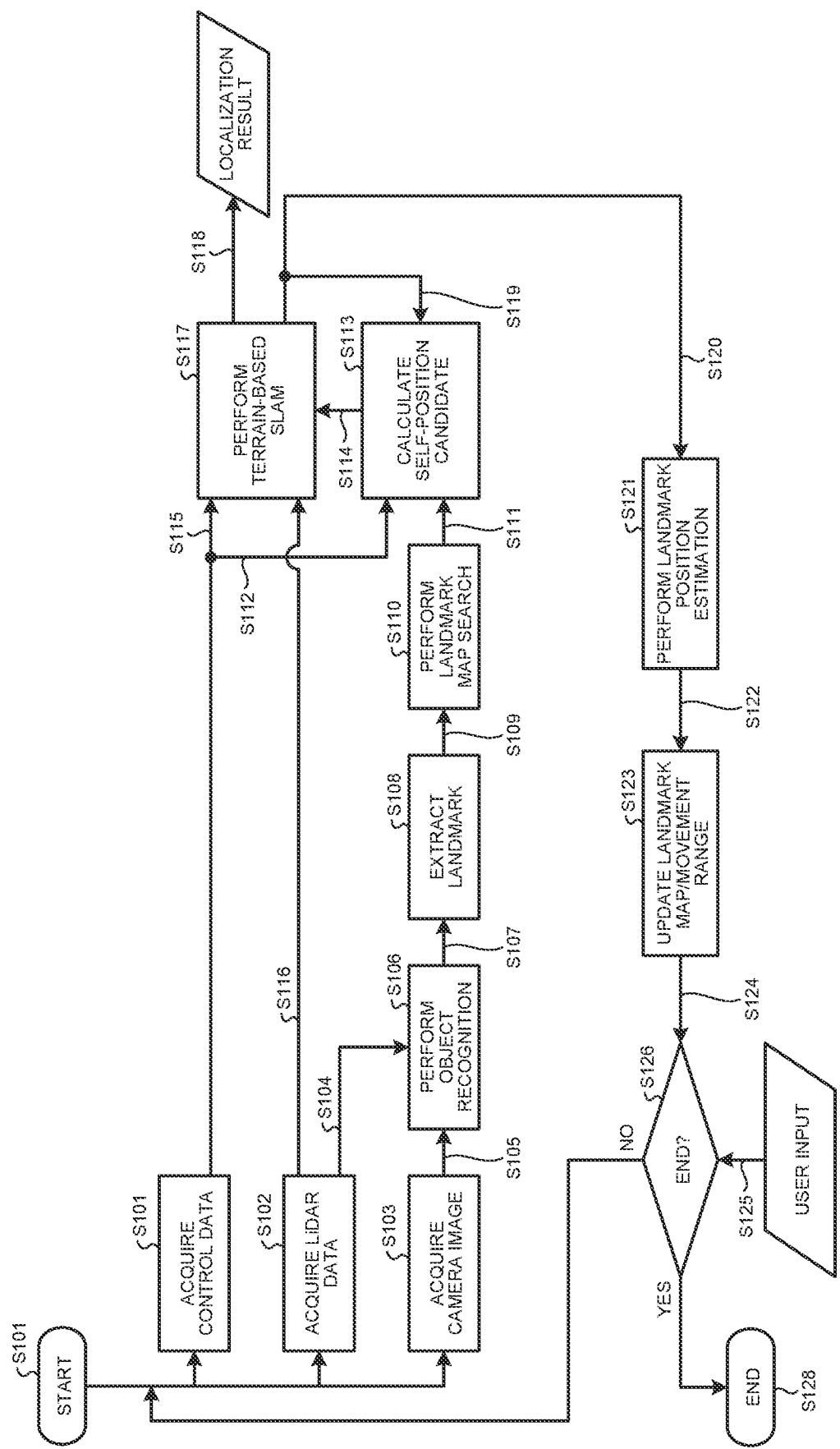
FIG. 15 is a flowchart (1) illustrating a flow of processing according to the embodiment.

Hereinafter, the procedure of information processing according to the embodiment will be described with reference to FIGS. 15 and 16. FIG. 15 is a flowchart (1) illustrating a flow of processing according to the embodiment.

As illustrated in FIG. 15, the information processing device 100 acquires control data via the detection unit 140 (step S101). Further, the information processing device 100 acquires LiDAR data (step S102). In addition, the information processing device 100 acquires a camera image (step S103).

The information processing device 100 transmits the LiDAR data (depth data) to a processing unit (step S104) and the camera image to the processing unit (step S105). The information processing device 100 then performs object recognition on the basis of the information acquired (step S106). The information processing device 100 transmits the result of the object recognition (for example, an object list detected from the image) to the subsequent stage (step S107).

The information processing device 100 extracts a landmark from the result of the object recognition (step S108). Subsequently, the information processing device 100 transmits the list of extracted landmarks to the subsequent stage (step S109). The information processing device 100 performs landmark map search (step S110). Specifically, the information processing device 100 searches for a landmark on a landmark map that matches the landmark extracted in step S108 and performs mapping.

The information processing device 100 transmits, as the result of the map search, data in which the information to which the information indicating the mapping with the landmark map (for example, the map matching information illustrated in FIG. 10) is added is integrated with the depth information and the landmark is represented by the relative coordinates of the information processing device 100 to the subsequent stage (step S111). Note that such data may be managed in a list in consideration of handling a plurality of landmarks.

Thereafter, the information processing device 100 acquires the result of the map search and the control data (step S112), and calculates a self-position candidate (step S113).

Specifically, the information processing device 100 predicts the self-position from the immediately preceding self-position using the control data, and predicts the coordinates of the landmark in combination with the landmark search result. The information processing device 100 then calculates (estimates) a possible candidate range of the self-position by collating the landmark prediction result with the landmark map and the landmark movement range. Note that the information processing device 100 may acquire not only the IMU data but also odometry information (a position, an orientation, a linear acceleration, an angular speed, and the like in a robot coordinate system) as the control data. Furthermore, the information processing device 100 acquires a terrain-based SLAM result obtained by processing the immediately preceding frame or the like (step S119), and calculates a self-position candidate. Moreover, the information processing device 100 acquires the movement range of each landmark and combines the movement range with the landmark map, thereby calculating a candidate position in consideration of the landmark movement range. Note that, in a case where the movement range of each landmark is not acquired, the information processing device 100 performs processing using a movement range that is a default value set in advance.

The information processing device 100 transmits the self-position candidate calculated (for example, data in which cell positions of possible coordinates are expressed in a list format in consideration of not only the most possible attitude of the information processing device 100 but also the movement amount of the landmark) to the subsequent stage (step S114).

Subsequently, the information processing device 100 acquires the control data and the LiDAR data (a point cloud) (steps S115 and S116), and performs terrain-based SLAM (step S117).

Specifically, the information processing device 100 performs detailed localization using a terrain-based map (a terrain data map) created from the LiDAR data or the like. At this time, the information processing device 100 may update each map according to environmental changes or may correct errors based on a technology such as loop closure.

More specifically, on the basis of point cloud information, the information processing device 100 creates a map by superimposition while considering the movement of the information processing device 100, or performs localization by collating with the map created. Furthermore, the information processing device 100 predicts a future self-position on the basis of the control data and the past self-position. Note that, in terrain-based positioning, mismatching is likely to occur in a case where a similar shape is present, but mismatching can be prevented by narrowing down a search area using a landmark-based self-position candidate.

The information processing device 100 transmits the localization result obtained by terrain-based SLAM to the driving control unit and the like (step S118). As the localization result, for example, a result obtained by removing an error of the past trajectory of the information processing device 100 is output in a list, for example. Furthermore, the localization result may include a terrain-based map in which the self-position is estimated. Note that in a case where the map is updated, a list of pairs of an updated cell and an updated value (coordinates) is also output. Further, the information processing device 100 transmits the updated map to the previous stage so that the updated map can be used at the timing of processing of calculating the next self-position candidate (step S119). Moreover, the information processing device 100 transmits the localization result to the subsequent stage (step S120).

Subsequently, the information processing device 100 performs landmark position estimation (step S121). For example, the information processing device 100 estimates the attitude of the landmark from the self-position estimated and the landmark map search result, compares the attitude with the original landmark map, and calculates the landmark movement range. Specifically, the information processing device 100 estimates the position of the landmark by combining the self-position information estimated and the landmark map search result. Furthermore, the information processing device 100 compares the estimated position of the landmark with the position on the landmark map, and calculates the movement amount of the landmark. As a result, the information processing device 100 acquires information (landmark observation information) such as the movement and attitude of the landmark. For example, the landmark observation information corresponds to the landmark observation history information 121 illustrated in FIG. 10. The information processing device 100 transmits the landmark observation information to the subsequent stage (step S122).

The information processing device 100 updates the landmark map and the landmark movement range on the basis of the landmark observation information of each landmark (step S123).

After transmitting the updated information to the subsequent stage (step S124), the information processing device 100 receives, for example, a user input indicating the end of the operation (step S125), and determines whether or not the operation of the information processing device 100 ends (step S126).

In a case where the operation does not end (step S126; No), the information processing device 100 repeats the processing of acquiring the surrounding data again. On the other hand, in a case where the operation ends (step S126; Yes), the information processing device 100 ends the information processing (step S128).

Next, FIG. 16 will be described. FIG. 16 is a flowchart (2) illustrating a flow of the processing according to the embodiment. FIG. 16 is a partial excerpt of FIG. 15, and illustrates a relationship between the procedure of information processing and data exchange in the storage unit 120.

Figure 16:
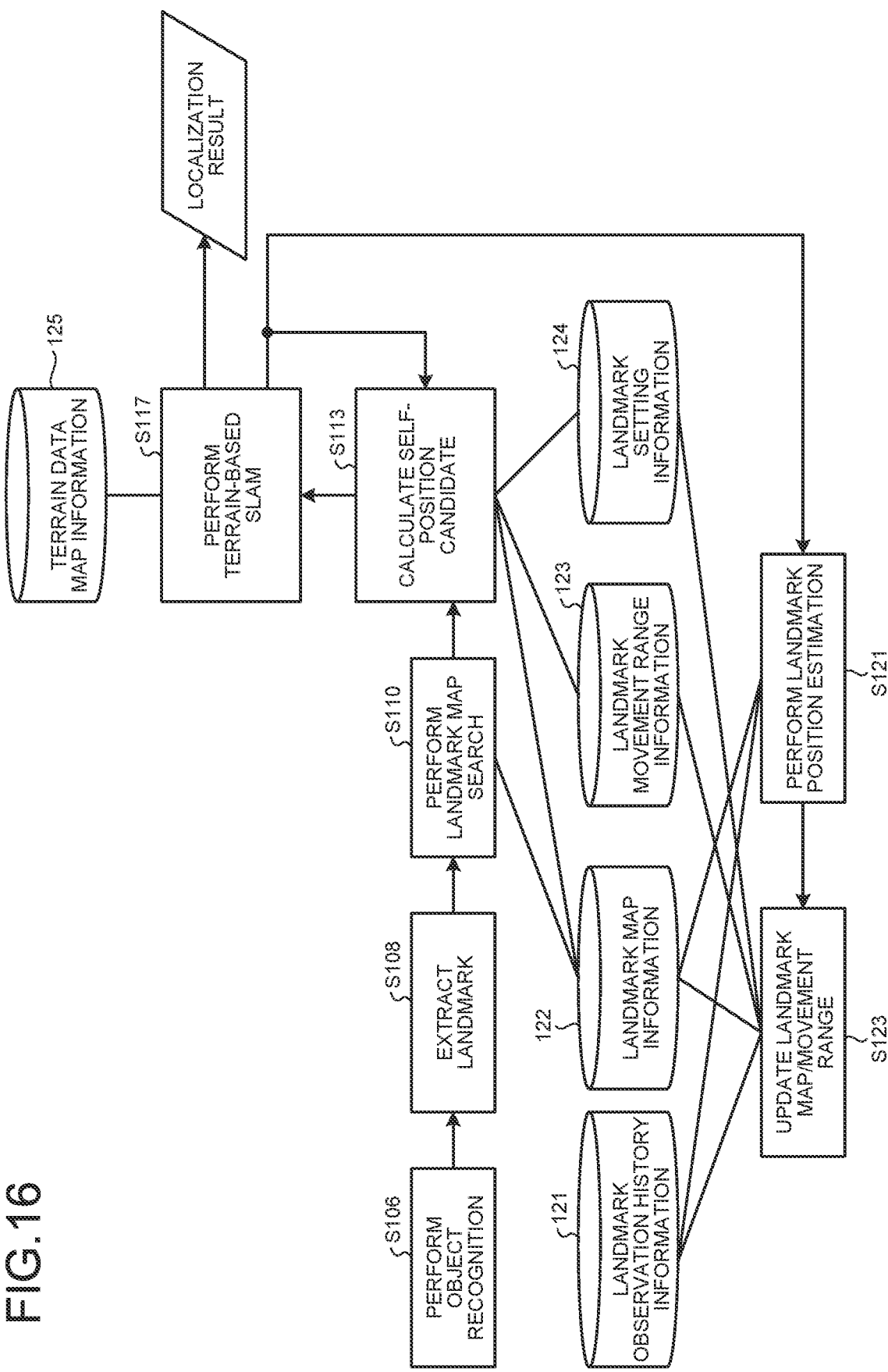
FIG. 16 is a flowchart (2) illustrating a flow of the processing according to the embodiment.

As illustrated in FIG. 16, the information processing device 100 refers to the landmark map information 122 in the landmark map search (step S110). Furthermore, the information processing device 100 refers to the landmark map information 122, the landmark movement range information 123, or the landmark setting information 124 in the calculation of the self-position candidate (step S113). Moreover, in a case where terrain-based SLAM is performed, the information processing device 100 refers to or updates the terrain data map information 125 (step S117).

Further, the information processing device 100 refers to or updates the landmark observation history information 121 and the landmark map information 122 in the estimation of the landmark position (step S121). Furthermore, the information processing device 100 refers to or updates the landmark observation history information 121, the landmark map information 122, the landmark movement range information 123, or the landmark setting information 124 in updating the landmark map or the movement range (step S123).

1-4. Modification According to Embodiment

The information processing according to the embodiment may be performed in various different forms other than the embodiment described above. Other embodiments of the information processing device 100 will be described below.

[1-4-1. Example of Calculation of Landmark Movement Range]

The above embodiment has described an example in which the information processing device 100 calculates the landmark movement range by repeating the trial observation of the landmark. Here, the landmark movement range corresponds to the probability density function of a landmark position.

That is, a small landmark movement range indicates that a shape that has a peak at a specific position in a case where the existence probability of the landmark is represented on the vertical axis is obtained, and the existence probability of the landmark is high at a peak position. On the other hand, when the landmark movement range is large, the existence probability of the landmark has a gentle shape, and the existence probability of the landmark also varies largely.

This relationship typically indicates that the existence probability of the landmark can be expressed as a Gaussian distribution. That is, when the Gaussian distribution is estimated on the basis of a landmark observation history, the mean (center) of the Gaussian distribution can be estimated as the landmark position, and the variance of the Gaussian distribution can be estimated as the landmark movement range. The information processing device 100 may obtain the landmark movement range by such a calculation method.

Figure 17A:
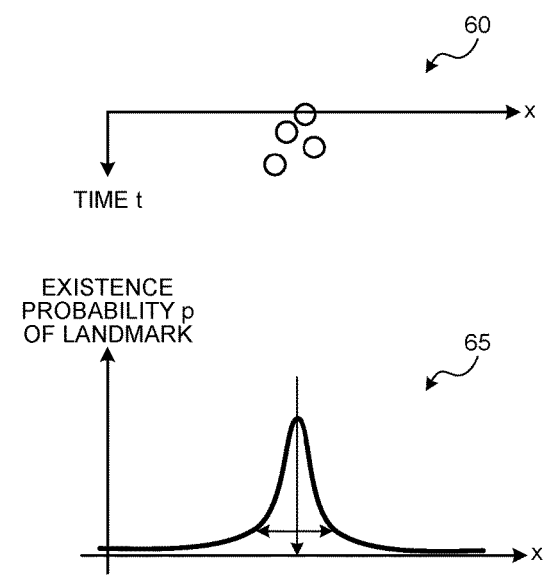
FIGS. 17A and 17B are diagrams for explaining an example of localization calculation processing of the present disclosure.
Figure 17B:
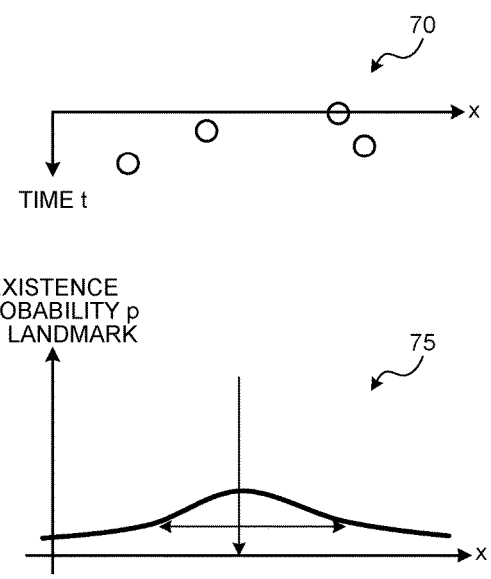

This will be described with reference to FIGS. 17A and 17B. FIGS. 17A and 17B are diagrams for explaining an example of localization calculation processing of the present disclosure. A distribution 60 illustrated in FIG. 17A indicates the variation in the landmark position (the horizontal axis x indicates the position (coordinates) where the landmark is observed. Further, when the existence probability of the landmark is represented on the vertical axis, the distribution 60 is illustrated as a graph 65. The peak of the graph of the graph 65 corresponds to the existence probability of the landmark, and the width in the lateral direction drawn in the graph corresponds to the landmark movement range.

In addition, a distribution 70 illustrated in FIG. 17B illustrates a distribution related to landmarks having a larger variation in landmark position as compared with the distribution 60. In this case, when the existence probability of the landmark is represented on the vertical axis, the distribution 70 is illustrated as a graph 75. The peak of the graph of the graph 75 corresponds to the existence probability of the landmark, and the width in the lateral direction drawn in the graph corresponds to the landmark movement range. It can be found that the graph 75 has a wider landmark movement range than the graph 65, and it is difficult to uniquely specify the position of the landmark (the existence probability is scattered).

As described above, as for the landmark movement range, the information processing device 100 may calculate (estimate) the landmark movement range using the probability density function instead of determining that the landmarks are present at the same probability in all the observed positions. As a result, the information processing device 100 can calculate a more realistic landmark movement range.

[1-4-2. Information Processing System]

The above embodiment has described an example in which the information processing device 100 is a mobile object that performs information processing according to the present disclosure and controls self-driving. However, the information processing device 100 may be implemented as an information processing system 1 including a client 200 and a server 300.

For example, the client 200 includes an RGB camera 201 for landmark recognition and a depth sensor 202 for terrain measurement. The RGB camera 201 for landmark recognition corresponds to the first sensor 141 illustrated in FIG. 9. The depth sensor 202 for terrain measurement corresponds to the second sensor 142 illustrated in FIG. 9.

In addition, the client 200 includes a processor 203, a memory 204, and a storage unit 205. For example, the client 200 uses hardware resources such as the processor 203, the memory 204, and the storage unit 205 to perform processing corresponding to the acquisition unit 131, the driving control unit 134, the input unit 150, and the output unit 160 illustrated in FIG. 9. In addition, the client 200 transmits the acquired information to the server 300 via a communication unit 206.

The server 300 receives information from the client 200 via a communication unit 301. In addition, the server 300 performs processing corresponding to the first estimation unit 132, the second estimation unit 133, and the like illustrated in FIG. 9 using hardware resources such as a processor 302, a memory 303, and a storage unit 304.

Figure 18:
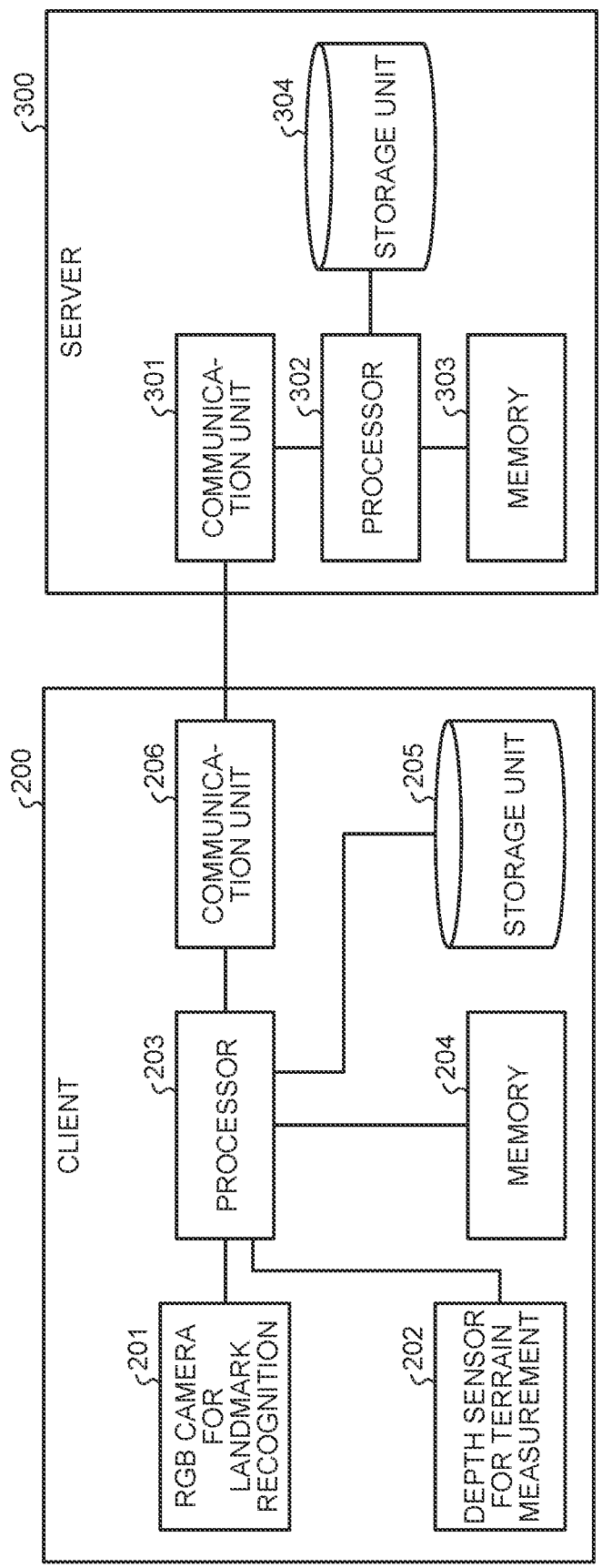
FIG. 18 is a diagram illustrating a configuration example of an information processing system according to a modification.

As described above, the information processing according to the present disclosure is not necessarily performed in a stand-alone manner as in the information processing device 100, but may be performed by the information processing system 1 including the client 200 and the server 300. Note that the number of devices constituting the information processing system 1 is not limited to the example illustrated in FIG. 18. For example, the server 300 may control a plurality of the clients 200. Furthermore, the information processing system 1 does not necessarily need to perform all the processing performed by the information processing device 100. Moreover, the configuration of the information processing system 1 is not necessarily limited to the configuration illustrated in FIG. 18, and may be flexibly changed. Further, the server 300 may be installed on a local network or may be a so-called cloud server installed on a cloud.

2. Other Embodiments

The processing according to each embodiment described above may be performed in various different modes other than each embodiment described above.

2-1. Configuration of Mobile Object

The above embodiment has described an example in which the information processing device 100 is mounted on a mobile object. However, the information processing device 100 may be implemented by an autonomous mobile object (for example, an automobile) itself that performs self-driving. In this case, the information processing device 100 may have the following configuration in addition to the configuration illustrated in FIG. 9. Each unit to be described below may be included in the configuration illustrated in FIG. 9, for example.

For example, the mobile object includes a self-driving control unit, a detection unit, a localization unit, a situation analysis unit, a planning unit, and an operation control unit. Furthermore, the mobile object may include an input unit, a data acquisition unit, a vehicle communication unit, an in-vehicle apparatus, an output control unit, an output unit, a drive-system control unit, a drive-system system, a body-system control unit, a body-system system, a vehicle storage unit, and a self-driving control unit.

The input unit includes a device used by a passenger for inputting various data, instructions, and the like. For example, the input unit includes an operation device such as a touch panel, a button, a microphone, a switch, and a lever, an operation device that can be input by a method other than a manual operation using voice, gesture, or the like, and the like. Furthermore, for example, the input unit may be a remote control device using infrared rays or other radio waves, or an external connection apparatus such as a mobile apparatus or a wearable apparatus compatible with the operation of the information processing device 100. The input unit generates an input signal on the basis of data, an instruction, or the like input by the passenger, and supplies the input signal to each unit of the information processing device 100.

The data acquisition unit includes various sensors and the like that acquire data used for processing the mobile object, and supplies the acquired data to each unit of the mobile object.

For example, the data acquisition unit includes various sensors for detecting a state of a host vehicle or the like. Specifically, for example, the data acquisition unit includes a gyro sensor, an acceleration sensor, an inertial measurement unit (IMU), and a sensor for detecting an operation amount of an accelerator pedal, an operation amount of a brake pedal, a steering angle of a steering wheel, an engine speed, a motor speed, a wheel rotation speed, or the like, and the like.

In addition, for example, the data acquisition unit includes various sensors for detecting information outside the host vehicle. Specifically, the data acquisition unit includes, for example, an image capturing device such as a time of flight (ToF) camera, a stereo camera, a monocular camera, an infrared camera, or other cameras. Furthermore, for example, the data acquisition unit includes an environment sensor for detecting weather, climate, or the like, and a surrounding information detection sensor for detecting an object around the host vehicle. The environment sensor includes, for example, a raindrop sensor, a fog sensor, a sunshine sensor, a snow sensor, and the like. The surrounding information detection sensor includes, for example, an ultrasonic sensor, a radar, a light detection and ranging or laser imaging detection and ranging (LiDAR), a sonar, and the like.

Furthermore, for example, the data acquisition unit includes various sensors for detecting the current position of the host vehicle. Specifically, the data acquisition unit includes, for example, a global navigation satellite system (GNSS) receiver that receives a GNSS signal from a GNSS satellite and the like.

Further, the data acquisition unit includes, for example, various sensors for detecting information inside the vehicle. Specifically, the data acquisition unit includes, for example, an image capturing device that captures the driver, a biological sensor that detects biological information of the driver, a microphone that collects sound in the vehicle interior, and the like. The biological sensor is provided, for example, on a seat surface, a steering wheel, or the like, and detects biological information of a passenger sitting on a seat or the driver gripping the steering wheel.

The vehicle communication unit communicates with an in-vehicle apparatus, various apparatuses outside the vehicle, a server, a base station, and the like, transmits data supplied from each unit of the mobile object, and supplies received data to each unit of the mobile object. Note that the communication protocol supported by the vehicle communication unit is not particularly limited, and the vehicle communication unit can support a plurality of types of communication protocols.

For example, the vehicle communication unit performs wireless communication with the in-vehicle apparatus by wireless LAN, Bluetooth (registered trademark), near field communication (NFC), wireless USB (WUSB), or the like. Furthermore, for example, the vehicle communication unit performs wired communication with the in-vehicle apparatus by universal serial bus (USB), high-definition multimedia interface (HDMI) (registered trademark), mobile high-definition link (MHL), or the like via a connection terminal (and, if necessary, a cable).

Furthermore, for example, the vehicle communication unit communicates with an apparatus (for example, an application server or a control server) that is present on an external network (for example, the Internet, a cloud network, or a company-specific network) via a base station or an access point. Moreover, for example, the vehicle communication unit performs communication with a terminal (for example, a terminal of a pedestrian or a store, or a machine type communication (MTC) terminal) near the host vehicle using a peer to peer (P2P) technology. Further, for example, the vehicle communication unit performs V2X communication such as vehicle to vehicle communication, vehicle to infrastructure communication, vehicle to home communication, and vehicle to pedestrian communication. Furthermore, for example, the vehicle communication unit includes a beacon receiving unit, receives radio waves or electromagnetic waves transmitted from a wireless station or the like installed on a road, and acquires information such as a current position, a traffic congestion, a traffic regulation, or required time.

The in-vehicle apparatus includes, for example, a mobile apparatus or a wearable apparatus possessed by a passenger, an information apparatus carried in or attached to the host vehicle, a navigation device that searches for a route to any destination, and the like.

The output control unit controls outputs of various types of information to the passenger of the host vehicle or the outside of the vehicle. For example, the output control unit generates an output signal including at least one of visual information (for example, image data) and auditory information (for example, audio data) and supplies the output signal to the output unit, thereby controlling the output of the visual information and the auditory information from the output unit. Specifically, for example, the output control unit combines image data captured by different image capturing devices in the data acquisition unit to generate an overhead image, a panoramic image, or the like, and supplies an output signal including the generated image to the output unit. Furthermore, for example, the output control unit generates audio data including alert sound, an alert message, or the like for danger such as collision, contact, or entry into a danger zone, and supplies an output signal including the generated audio data to the output unit.

The output unit includes a device capable of outputting visual information or auditory information to the passenger of the host vehicle or the outside of the vehicle. For example, the output unit includes a display device, an instrument panel, an audio speaker, a headphone, a wearable device such as a glasses-type display worn by a passenger, a projector, a lamp, and the like. The display device included in the output unit may be a device that displays visual information in the field of view of the driver, such as a head-up display, a transmissive display, or a device having an augmented reality (AR) display function, in addition to a device with a normal display.

The drive-system control unit controls a drive-system system by generating various control signals and supplying the control signals to the drive-system system. In addition, the drive-system control unit supplies a control signal to each unit other than the drive-system system as necessary, and notifies each unit of a control state of the drive-system system or the like.

The drive-system system includes various devices related to the drive system of the host vehicle. For example, the drive-system system includes a driving force generation device for generating a driving force such as an internal combustion engine or a driving motor, a driving force transmission mechanism for transmitting a driving force to wheels, a steering mechanism for adjusting a steering angle, a braking device for generating a braking force, an antilock brake system (ABS), an electronic stability control (ESC), an electric power steering device, and the like.

The body-system control unit controls a body-system system by generating various control signals and supplying the control signals to the body-system system. In addition, the body-system control unit supplies a control signal to each unit other than the body-system system as necessary, and notifies each unit of a control state of the body-system system or the like.

The body-system system includes various devices of a body system mounted on a vehicle body. For example, the body-system system includes a keyless entry system, a smart key system, a power window device, a power seat, a steering wheel, an air conditioner, various lamps (for example, a head lamp, a back lamp, a brake lamp, a blinker, a fog lamp, and the like), and the like.

The vehicle storage unit includes, for example, a read only memory (ROM), a random access memory (RAM), a magnetic storage device such as a hard disc drive (HDD), a semiconductor storage device, an optical storage device, a magneto-optical storage device, and the like. The vehicle storage unit stores various programs, data, and the like used by each unit of the mobile object. For example, the vehicle storage unit stores map data such as a three-dimensional high-precision map such as a dynamic map, a global map that is less accurate than the high-precision map and covers a wide area, and a local map including information around the host vehicle.

The self-driving control unit executes control related to self-driving such as autonomous traveling or driving support. Specifically, for example, the self-driving control unit executes cooperative control for the purpose of implementing functions of an advanced driver assistance system (ADAS) including collision avoidance or impact mitigation of the host vehicle, follow-up traveling based on an inter-vehicle distance, traveling while maintaining a vehicle speed, a collision alert of the host vehicle, a lane departure alert of the host vehicle, and the like. Furthermore, for example, the self-driving control unit executes cooperative control for the purpose of self-driving or the like in which the vehicle autonomously travels without depending on the operation of the driver. The self-driving control unit includes a detection unit, a localization unit, a situation analysis unit, a planning unit, and an operation control unit.

The detection unit detects various types of information necessary for controlling self-driving. The detection unit includes an outside-vehicle information detection unit, an inside-vehicle information detection unit, and a vehicle state detection unit.

The outside-vehicle information detection unit performs processing of detecting information outside the host vehicle on the basis of data or signals from the respective units of the mobile object. For example, the outside-vehicle information detection unit performs processing of detecting, recognizing, and tracking an object around the host vehicle, and processing of detecting a distance to the object. Examples of the object to be detected include a vehicle, a person, an obstacle, a structure, a road, a traffic light, a traffic sign, a road sign, and the like. Furthermore, for example, the outside-vehicle information detection unit performs processing of detecting an environment around the host vehicle. The surrounding environment to be detected includes, for example, weather, temperature, humidity, brightness, a state of a road surface, and the like. The outside-vehicle information detection unit supplies data indicating the result of the detection processing to the localization unit, a map analysis unit, a traffic rule recognition unit, and a situation recognition unit of the situation analysis unit, an emergency avoidance unit of the operation control unit, and the like.

The inside-vehicle information detection unit performs processing of detecting information inside the vehicle on the basis of data or signals from the respective units of the mobile object. For example, the inside-vehicle information detection unit performs processing of authenticating and recognizing the driver, processing of detecting the state of the driver, processing of detecting the passenger, processing of detecting the environment in the vehicle, and the like. The state of the driver to be detected includes, for example, a physical condition, a wakefulness level, a concentration level, a fatigue level, a line-of-sight direction, and the like. The environment in the vehicle to be detected includes, for example, temperature, humidity, brightness, odor, and the like. The inside-vehicle information detection unit supplies data indicating the result of the detection processing to the situation recognition unit of the situation analysis unit, the emergency avoidance unit of the operation control unit, and the like.

The vehicle state detection unit performs processing of detecting the state of the host vehicle on the basis of data or signals from the respective units of the mobile object. The state of the host vehicle to be detected includes, for example, a speed, an acceleration, a steering angle, the presence or absence and contents of an abnormality, a state of a driving operation, a position and inclination of a power seat, a state of door lock, and a state of other in-vehicle apparatuses. The vehicle state detection unit supplies data indicating the result of the detection processing to the situation recognition unit of the situation analysis unit, the emergency avoidance unit of the operation control unit, and the like.

The localization unit performs processing of estimating the position, attitude, and the like of the host vehicle on the basis of data or signals from the respective units of the mobile object such as the outside-vehicle information detection unit and the situation recognition unit of the situation analysis unit. Furthermore, the localization unit generates a local map (hereinafter, referred to as "localization map") used for localization as necessary. The localization map is, for example, a highly accurate map using a technology such as simultaneous localization and mapping (SLAM). The localization unit supplies data indicating the result of the localization processing to the map analysis unit, the traffic rule recognition unit, the situation recognition unit, and the like in the situation analysis unit. Further, the localization unit stores the localization map in the vehicle storage unit.

The situation analysis unit performs processing of analyzing the host vehicle and the surrounding situation. The situation analysis unit includes the map analysis unit, the traffic rule recognition unit, the situation recognition unit, and the situation prediction unit.

The map analysis unit performs processing of analyzing various maps stored in the vehicle storage unit while using data or signals from the respective units of the mobile object such as the localization unit and the outside-vehicle information detection unit as necessary, and constructs a map including information necessary for self-driving processing. The map analysis unit supplies the constructed map to the traffic rule recognition unit, the situation recognition unit, the situation prediction unit, and a route planning unit, an action planning unit, an operation planning unit of the planning unit, and the like.

The traffic rule recognition unit performs processing of recognizing traffic rules around the host vehicle on the basis of data or signals from the respective units of the mobile object such as the localization unit, the outside-vehicle information detection unit, and the map analysis unit. By performing this recognition processing, for example, the position and state of a traffic signal around the host vehicle, the contents of traffic regulations around the host vehicle, a lane on which the host vehicle can travel, and the like are recognized. The traffic rule recognition unit supplies data indicating the result of the recognition processing to the situation prediction unit and the like.

The situation recognition unit performs processing of recognizing a situation related to the host vehicle on the basis of data or signals from the respective units of the mobile object such as the localization unit, the outside-vehicle information detection unit, the inside-vehicle information detection unit, the vehicle state detection unit, and the map analysis unit. For example, the situation recognition unit performs processing of recognizing a situation of the host vehicle, a situation around the host vehicle, a situation of the driver of the host vehicle, and the like. Furthermore, the situation recognition unit generates a local map (hereinafter, referred to as "situation recognition map") used for recognizing the situation around the host vehicle as necessary. The situation recognition map is, for example, an occupancy grid map.

The situation of the host vehicle to be recognized includes, for example, the position, attitude, and movement (for example, a speed, an acceleration, a moving direction, and the like) of the host vehicle, and the presence or absence and content of an abnormality. The situation around the host vehicle to be recognized includes, for example, the type and position of a surrounding stationary object, the type, position, and movement (for example, a speed, an acceleration, a moving direction, and the like) of a surrounding moving object, the configuration of a surrounding road and the state of a road surface, and surrounding weather, temperature, humidity, brightness, and the like. The state of the driver to be recognized includes, for example, a physical condition, a wakefulness level, a concentration level, a fatigue level, a movement of a line of sight, a driving operation, and the like.

The situation recognition unit supplies data (including a situation recognition map as necessary.) indicating the result of the recognition processing to the localization unit, the situation prediction unit, and the like. Further, the situation recognition unit stores the situation recognition map in the vehicle storage unit.

The situation prediction unit performs processing of predicting a situation related to the host vehicle on the basis of data or signals from the respective units of the mobile object such as the map analysis unit, the traffic rule recognition unit, and the situation recognition unit. For example, the situation prediction unit performs processing of predicting a situation of the host vehicle, a situation around the host vehicle, a situation of the driver, and the like.

The situation of the host vehicle to be predicted includes, for example, the behavior of the host vehicle, the occurrence of an abnormality, a travelable distance, and the like. The situation around the host vehicle to be predicted includes, for example, the behavior of a moving object around the host vehicle, a change in the state of a traffic signal, a change in an environment such as weather, and the like. The situation of the driver to be predicted includes, for example, the behavior and physical condition of the driver.

The situation prediction unit supplies data indicating the result of the prediction processing together with data from the traffic rule recognition unit and the situation recognition unit to the route planning unit, the action planning unit, the operation planning unit of the planning unit, and the like.

The route planning unit plans a route to a destination on the basis of data or signals from the respective units of the mobile object such as the map analysis unit and the situation prediction unit. For example, the route planning unit sets a route from the current position to a designated destination on the basis of a global map. In addition, for example, the route planning unit appropriately changes the route on the basis of a situation such as a traffic congestion, an accident, a traffic regulation, and a construction, the physical condition of the driver, and the like. The route planning unit supplies data indicating the planned route to the action planning unit or the like.

The action planning unit plans an action of the host vehicle for safely traveling the route planned by the route planning unit within a planned time on the basis of data or signals from the respective units of the mobile object such as the map analysis unit and the situation prediction unit. For example, the action planning unit performs planning of start, stop, a traveling direction (for example, a forward movement, a backward movement, a left turn, a right turn, a direction change, and the like), a traveling lane, a traveling speed, overtaking, and the like. The action planning unit supplies data indicating the planned action of the host vehicle to the operation planning unit and the like.

The operation planning unit plans the operation of the host vehicle for achieving the action planned by the action planning unit on the basis of data or signals from the respective units of the mobile object such as the map analysis unit and the situation prediction unit. For example, the operation planning unit performs planning of acceleration, deceleration, a travel trajectory, and the like. The operation planning unit supplies data indicating the planned operation of the host vehicle to an acceleration and deceleration control unit, a direction control unit, and the like of the operation control unit.

The operation control unit controls the operation of the host vehicle. The operation control unit includes the emergency avoidance unit, the acceleration and deceleration control unit, and the direction control unit.

The emergency avoidance unit performs processing of detecting an emergency such as collision, contact, entry into a danger zone, an abnormality of a driver, and an abnormality of a vehicle on the basis of detection results of the outside-vehicle information detection unit, the inside-vehicle information detection unit, and the vehicle state detection unit. When detecting the occurrence of an emergency, the emergency avoidance unit plans an operation of the host vehicle for avoiding the emergency such as a sudden stop or a sudden turn. The emergency avoidance unit supplies data indicating the planned operation of the host vehicle to the acceleration and deceleration control unit, the direction control unit, and the like.

The acceleration and deceleration control unit executes acceleration and deceleration control for achieving the operation of the host vehicle planned by the operation planning unit or the emergency avoidance unit. For example, the acceleration and deceleration control unit calculates a control target value of the driving force generation device or the braking device for achieving planned acceleration, deceleration, or sudden stop, and supplies a control command indicating the calculated control target value to the drive-system control unit.

The direction control unit executes direction control for achieving the operation of the host vehicle planned by the operation planning unit or the emergency avoidance unit. For example, the direction control unit calculates a control target value of the steering mechanism for achieving a travel trajectory or a sudden turn planned by the operation planning unit or the emergency avoidance unit, and supplies a control command indicating the calculated control target value to the drive-system control unit.

2-2. Others

Among the processing described in the above embodiments, all or a part of the processing described as being automatically performed can be manually performed, or all or a part of the processing described as being manually performed can be automatically performed by a known method.

In addition, the processing procedure, specific name, and information including various data and parameters illustrated in the document and the drawings can be arbitrarily changed unless otherwise specified. For example, the various types of information illustrated in the respective drawings are not limited to the illustrated information.

In addition, each component of each device illustrated in the drawings is functionally conceptual, and is not necessarily physically configured as illustrated in the drawings. That is, a specific form of distribution and integration of each device is not limited to the illustrated form, and all or a part thereof can be functionally or physically distributed and integrated in an arbitrary unit according to various loads, usage conditions, and the like.

In addition, the embodiments and modifications described above can be appropriately combined within the range in which processing contents do not contradict each other. Further, in the above embodiment, the self-traveling robot is taken as an example of the mobile object, but the information processing of the present disclosure is also applicable to a mobile object other than the self-traveling robot. For example, the mobile object may be a small vehicle such as a motorcycle or a motor tricycle, a large vehicle such as a bus or a truck, or an autonomous mobile object such as a drone.

Furthermore, the effects described in the present specification are merely examples and are not limited, and other effects may be provided.

3. Effects of Information Processing Device According to Present Disclosure

As described above, the information processing device (the information processing device 100 in the embodiment) according to the present disclosure includes the acquisition unit (the acquisition unit 131 in the embodiment), the first estimation unit (the first estimation unit 132 in the embodiment), and the second estimation unit (the second estimation unit 133 in the embodiment). The acquisition unit acquires an arrangement of landmarks and surrounding terrain data. The first estimation unit estimates a range in which a self-position is located on the basis of a landmark map that is a map indicating the arrangement of landmarks. The second estimation unit estimates the self-position from the range in which the self-position is located on the basis of a terrain data map that is a map indicating the surrounding terrain data.

As described above, the information processing device according to the present disclosure estimates the range in which the self-position is located on the basis of the landmark map, and further estimates the self-position from the range on the basis of the terrain data map. As a result, the information processing device can perform localization and mapping processing stable with respect to changes in the surrounding environment.

In addition, the acquisition unit acquires the landmark movement range together with the arrangement of landmarks. The first estimation unit estimates the range in which the self-position is located on the basis of the arrangement of landmarks and the landmark movement range. The second estimation unit estimates the self-position from the range in which the self-position is located on the basis of the terrain data map and the landmark movement range. As described above, by acquiring the landmark movement range, the information processing device can use the landmark for localization even if the landmark is assumed to move frequently.

Furthermore, the acquisition unit acquires the movement ranges of the plurality of landmarks together with the arrangement of the plurality of landmarks. The first estimation unit estimates the range in which the self-position is located on the basis of the arrangement of the plurality of landmarks and the movement ranges of the plurality of landmarks. The second estimation unit estimates the self-position from the range in which the self-position is located on the basis of the terrain data map and the movement ranges of the plurality of landmarks. As a result, the information processing device can improve the accuracy of localization.

Moreover, the second estimation unit estimates the self-position from the range in which the self-position is located on the basis of a plurality of candidates for the self-position estimated on the basis of the movement range of each landmark. As a result, the information processing device can narrow down the position where the self-position is highly likely to be located on the basis of the plurality of candidates for the self-position, so that the accuracy of localization can be improved.

The acquisition unit also acquires a movement range set in advance for each category of the landmark together with the arrangement of landmarks. The first estimation unit estimates the range in which the self-position is located on the basis of the arrangement of the landmarks and the movement range set in advance for each category of the landmark. The second estimation unit estimates the self-position from the range in which the self-position is located on the basis of the terrain data map and the movement range set in advance for each category of the landmark. As a result, the information processing device can achieve localization using a frequently moving landmark even before acquiring the actual landmark movement range.

Furthermore, the acquisition unit acquires control data that controls the operation of the information processing device. The second estimation unit estimates the self-position from the range in which the self-position is located on the basis of the terrain data map and the control data. As a result, the information processing device can use the control data of the information processing device such as IMU data as an element for estimation, so that the accuracy of estimation can be improved.

Further, the landmark includes personal belongings including stationery or tableware that can be carried by a person. As a result, the information processing device can perform information processing using personal belongings useful for position estimation although the movement frequency is high, instead of a landmark with a low movement frequency generally used in SLAM.

In addition, the acquisition unit acquires the arrangement of landmarks by image recognition processing using an image sensor, and acquires terrain data from depth data using a depth sensor. As a result, the information processing device can efficiently acquire the landmark map and the terrain data map.

Furthermore, the acquisition unit acquires the arrangement of landmarks by image recognition processing using an image captured by a red green blue (RGB) camera, and acquires terrain data by depth data measured using a light detection and ranging, or laser Imaging detection and ranging (LiDAR) method. As a result, the information processing device can acquire the landmark map and the terrain data map on the basis of reliable data such as high-resolution data.

4. Hardware Configuration

Figure 19:
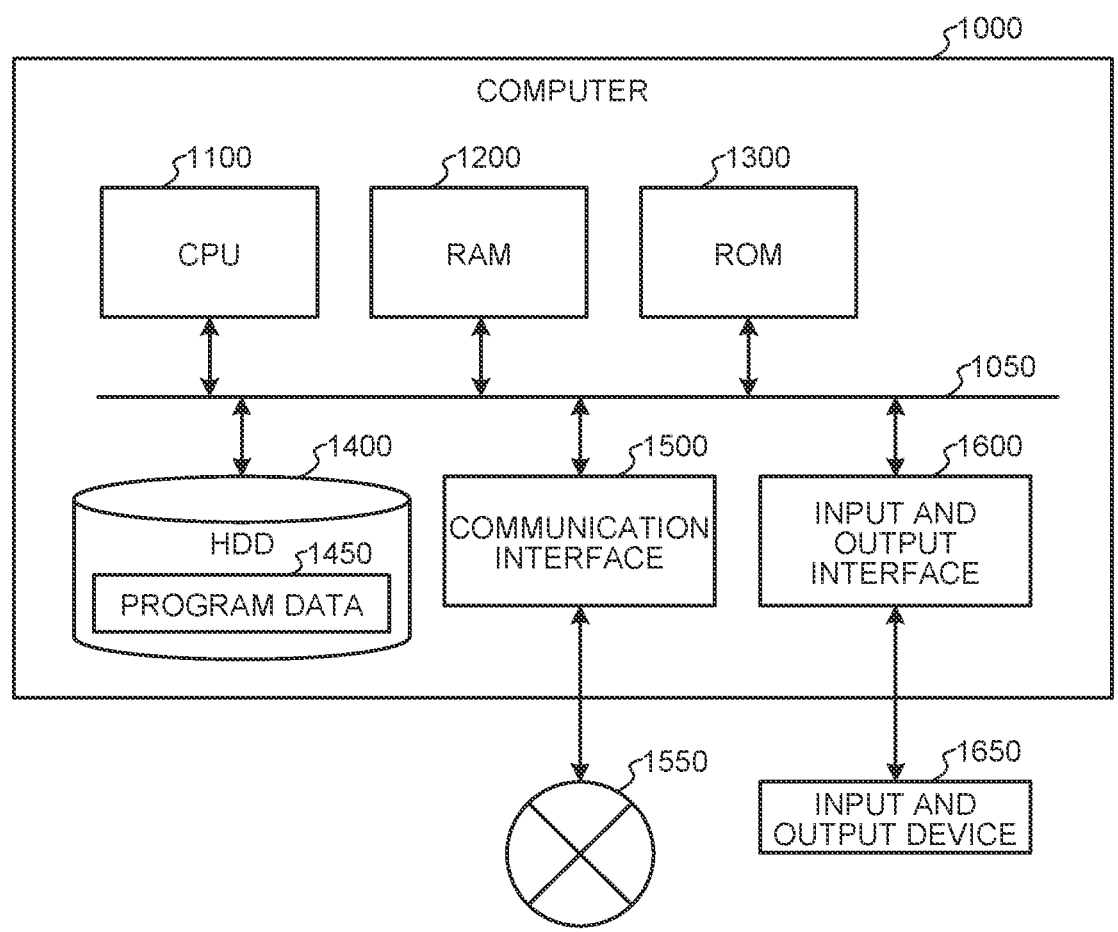
FIG. 19 is a hardware configuration diagram illustrating an example of a computer that implements functions of an information processing device.

The information apparatuses such as the information processing device 100, the client 200, and the server 300 according to the embodiment described above are implemented by a computer 1000 with a configuration illustrated in FIG. 19, for example. Hereinafter, the information processing device 100 according to the embodiment will be described as an example. FIG. 19 is a hardware configuration diagram illustrating an example of the computer 1000 that implements functions of the information processing device 100. The computer 1000 includes a CPU 1100, a RAM 1200, a read only memory (ROM) 1300, a hard disk drive (HDD) 1400, a communication interface 1500, and an input and output interface 1600. The respective units of the computer 1000 are connected to each other by a bus 1050.

The CPU 1100 operates on the basis of a program stored in the ROM 1300 or the HDD 1400, and controls each unit. For example, the CPU 1100 develops a program stored in the ROM 1300 or the HDD 1400 in the RAM 1200, and performs processing corresponding to various programs.

The ROM 1300 stores a boot program such as a basic input output system (BIOS) executed by the CPU 1100 when the computer 1000 starts up, a program depending on hardware of the computer 1000, and the like.

The HDD 1400 is a computer-readable recording medium that non-transiently records a program executed by the CPU 1100, data used by the program, and the like. Specifically, the HDD 1400 is a recording medium that records the information processing program according to the present disclosure, which is an example of program data 1450.

The communication interface 1500 is an interface for the computer 1000 to connect to an external network 1550 (for example, the Internet). For example, the CPU 1100 receives data from another apparatus or transmits data generated by the CPU 1100 to another apparatus via the communication interface 1500.

The input and output interface 1600 is an interface for connecting an input and output device 1650 to the computer 1000. For example, the CPU 1100 receives data from an input device such as a keyboard or a mouse via the input and output interface 1600. In addition, the CPU 1100 transmits data to an output device such as a display, a speaker, or a printer via the input and output interface 1600. Furthermore, the input and output interface 1600 may function as a media interface that reads a program or the like recorded in a predetermined recording medium (a medium). The medium includes, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, and the like.

For example, in a case where the computer 1000 functions as the information processing device 100 according to the embodiment, the CPU 1100 of the computer 1000 implements the function of the control unit 130 or the like by executing the information processing program loaded on the RAM 1200. In addition, the HDD 1400 stores the information processing program according to the present disclosure and data in the storage unit 120. Note that the CPU 1100 reads the program data 1450 from the HDD 1400 and performs the program data, but as another example, these programs may be acquired from another device via the external network 1550.

Note that the present technology can also have the following configurations.

(1)

An information processing device comprising:
  an acquisition unit that acquires an arrangement of a landmark and surrounding terrain data;
  a first estimation unit that estimates a range in which a self-position is located on a basis of a landmark map that is a map indicating the arrangement of the landmark; and
  a second estimation unit that estimates the self-position from the range in which the self-position is located on a basis of a terrain data map that is a map indicating the surrounding terrain data.

(2)

The information processing device according to (1), wherein
  the acquisition unit
  acquires a landmark movement range together with the arrangement of the landmark,
  the first estimation unit
  estimates a range in which a self-position is located on a basis of the arrangement of the landmark and the landmark movement range, and
  the second estimation unit
  estimates the self-position from the range in which the self-position is located on a basis of the terrain data map and the landmark movement range.

(3)

The information processing device according to (2), wherein
  the acquisition unit
  acquires movement ranges of a plurality of landmarks together with an arrangement of the landmarks,
  the first estimation unit
  estimates a range in which a self-position is located on a basis of the arrangement of the landmarks and the movement ranges of the landmarks, and the second estimation unit
  estimates the self-position from the range in which the self-position is located on a basis of the terrain data map and the movement ranges of the landmarks.

(4)
The information processing device according to (3), wherein
  the second estimation unit
    estimates a self-position from a range in which the self-position is located on a basis of a plurality of candidates for the self-position estimated on a basis of a movement range of each landmark.

(5)
The information processing device according to any one of (1) to (4), wherein
  the acquisition unit
    acquires a movement range that is set in advance for each category of a landmark together with the arrangement of the landmark,
  the first estimation unit
    estimates a range in which a self-position is located on a basis of the arrangement of the landmark and the movement range that is set in advance for each category of the landmark, and
  the second estimation unit
    estimates the self-position from the range in which the self-position is located on a basis of the terrain data map and the movement range that is set in advance for each category of the landmark.

(6)
The information processing device according to any one of (1) to (5), wherein
  the acquisition unit
    acquires control data that controls an operation of the information processing device, and
  the second estimation unit
    estimates a self-position from a range in which the self-position is located on a basis of the terrain data map and the control data.

(7)
The information processing device according to any one of (1) to (6), wherein
  the landmark
    includes personal belongings including stationery or tableware that can be carried by a person.

(8)
The information processing device according to any one of (1) to (7), wherein
  the acquisition unit
    acquires the arrangement of the landmark by image recognition processing using an image sensor, and acquires the terrain data from depth data using a depth sensor.

(9)
The information processing device according to any one of (1) to (8), wherein
  the acquisition unit
    acquires the arrangement of the landmark by image recognition processing using an image captured by a red green blue (RGB) camera, and acquires the terrain data by depth data measured using a light detection and ranging, or laser Imaging detection and ranging (Li-DAR) method.

(10)
An information processing method comprising causing a computer to perform:
  acquiring an arrangement of a landmark and surrounding terrain data;
  estimating a range in which a self-position is located on a basis of a landmark map that is a map indicating the arrangement of the landmark; and
  estimating the self-position in the range in which the self-position is located on a basis of a terrain data map that is a map indicating the surrounding terrain data.

(11)
An information processing program causing a computer to function as:
  an acquisition unit that acquires an arrangement of a landmark and surrounding terrain data;
  a first estimation unit that estimates a range in which a self-position is located on a basis of a landmark map that is a map indicating the arrangement of the landmark; and
  a second estimation unit that estimates the self-position from the range in which the self-position is located on a basis of a terrain data map that is a map indicating the surrounding terrain data.

REFERENCE SIGNS LIST

1 INFORMATION PROCESSING SYSTEM
100 INFORMATION PROCESSING DEVICE
110 COMMUNICATION UNIT
120 STORAGE UNIT
121 LANDMARK OBSERVATION HISTORY INFORMATION
122 LANDMARK MAP INFORMATION
123 LANDMARK MOVEMENT RANGE INFORMATION
124 LANDMARK SETTING INFORMATION
125 TERRAIN DATA MAP INFORMATION
130 CONTROL UNIT
131 ACQUISITION UNIT
132 FIRST ESTIMATION UNIT
133 SECOND ESTIMATION UNIT
134 DRIVING CONTROL UNIT
140 DETECTION UNIT
141 FIRST SENSOR
142 SECOND SENSOR
143 VEHICLE-BODY INFORMATION DETECTION UNIT
150 INPUT UNIT
160 OUTPUT UNIT
200 CLIENT
300 SERVER

The invention claimed is:

1. An information processing device, comprising:
an image sensor configured to capture an image of a landmark;
a depth sensor configured to detect depth data associated with a terrain surrounding the information processing device; and
circuitry configured to:
  execute an image recognition process on the captured image;
  acquire an arrangement of the landmark based on the image recognition process on the captured image;
  acquire a landmark movement range of the landmark;
  generate, based on the detected depth data, a first terrain data map indicating surrounding terrain data of the terrain;
  estimate, based on the arrangement of the landmark acquired, the landmark movement range and a landmark map indicating the arrangement of the landmark, a range in which a self-position of the information processing device is located;
position, on the first terrain data map, the estimated range in which the self-position is located;
generate a second terrain data map based on the position of the estimated range on the first terrain data map;
estimate, based on the second terrain data map and the landmark movement range, the self-position from the range in which the self-position is located; and
control self-driving of the information processing device based on the estimated self-position.

2. The information processing device according to claim 1, wherein the circuitry is further configured to:
acquire movement ranges of a plurality of landmarks together with an arrangement of the plurality of landmarks, wherein the plurality of landmarks includes the landmark;
estimate the range in which the self-position is located, based on the arrangement of the plurality of landmarks and the movement ranges of the plurality of landmarks; and
estimate the self-position from the range in which the self-position is located, based on the second terrain data map and the movement ranges of the plurality of landmarks.

3. The information processing device according to claim 2, wherein the circuitry is further configured to:
estimate a plurality of candidates for the self-position based on a movement range of each landmark of the plurality of landmarks; and
estimate the self-position from the range in which the self-position is located based on the plurality of candidates for the self-position.

4. The information processing device according to claim 1, wherein the landmark movement range is a movement range that is set in advance for each category of the landmark.

5. The information processing device according to claim 1, wherein the circuitry is further configured to:
acquire control data that controls an operation of the information processing device; and
estimate the self-position from the range in which the self-position is located, based on the second terrain data map, the landmark movement range and the control data.

6. The information processing device according to claim 1, wherein the landmark includes personal belongings including at least one of a stationery or a tableware that can be carried by a person.

7. The information processing device according to claim 1, wherein
the image sensor is a red green blue (RGB) camera, and
the depth sensor is configured to detect the depth data using a light detection and ranging, or laser imaging detection and ranging (LiDAR) method.

8. An information processing method, comprising:
capturing, by an image sensor of an information processing device, an image of a landmark;
detecting, by a depth sensor of the information processing device, depth data associated with a terrain surrounding the information processing device;
executing, by circuitry of the information processing device, an image recognition process on the captured image;
acquiring, by the circuitry, an arrangement of the landmark based on the image recognition process on the captured image;
acquiring, by the circuitry, a landmark movement range of the landmark;
generating, by the circuitry, based on the detected depth data, a first terrain data map indicating surrounding terrain data of the terrain;
estimating, by the circuitry, based on the arrangement of the landmark acquired, the landmark movement range and a landmark map indicating the arrangement of the landmark, a range in which a self-position of the information processing device is located;
positioning, by the circuitry, on the first terrain data map, the estimated range in which the self-position is located;
generating, by the circuitry, a second terrain data map based on the position of the estimated range on the first terrain data map;
estimating, by the circuitry, based on the second terrain data map and the landmark movement range, the self-position in the range in which the self-position is located; and
controlling, by the circuitry, self-driving of the information processing device based on the estimated self-position.

9. A non-transitory computer-readable medium having stored thereon, computer-executable instructions which, when executed by an information processing device, cause the information processing device to execute operations, the operations comprising:
capturing, by an image sensor of the information processing device, an image of a landmark;
detecting, by a depth sensor of the information processing device, depth data associated with a terrain surrounding the information processing device;
executing, by circuitry of the information processing device, an image recognition process on the captured image;
acquiring, by the circuitry, an arrangement of the landmark based on the image recognition process on the captured image;
acquiring, by the circuitry, a landmark movement range of the landmark;
generating, by the circuitry, based on the detected depth data, a first terrain data map indicating surrounding terrain data of the terrain;
estimating, by the circuitry, based on the arrangement of the landmark acquired, the landmark movement range and a landmark map indicating the arrangement of the landmark, a range in which a self-position of the information processing device is located;
positioning, by the circuitry, on the first terrain data map, the estimated range in which the self-position is located;
generating, by the circuitry, a second terrain data map based on the position of the estimated range on the first terrain data map;
estimating, by the circuitry, based on the second terrain data map and the landmark movement range, the self-position from the range in which the self-position is located; and
controlling, by the circuitry, self-driving of the information processing device based on the estimated self-position.

* * * * *